United States Patent
Weinstein et al.

(10) Patent No.: US 10,981,306 B1
(45) Date of Patent: Apr. 20, 2021

(54) CRYPTOGRAPHIC SYSTEM FOR SECURE COMMAND AND CONTROL OF REMOTELY CONTROLLED DEVICES

(71) Applicant: The Charles Stark Draper Laboratory, Inc., Cambridge, MA (US)

(72) Inventors: William W. Weinstein, Belmont, MA (US); James M. Zagami, Woburn, MA (US); Joshua B. Weader, Sharon, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 39 days.

(21) Appl. No.: 16/388,521

(22) Filed: Apr. 18, 2019

Related U.S. Application Data

(62) Division of application No. 15/834,508, filed on Dec. 7, 2017, now Pat. No. 10,313,314, which is a division (Continued)

(51) Int. Cl.
*H04L 29/06* (2006.01)
*H04L 9/08* (2006.01)
*B29C 44/34* (2006.01)

(52) U.S. Cl.
CPC ........ *B29C 44/3461* (2013.01); *H04L 9/0825* (2013.01); *H04L 63/0435* (2013.01); (Continued)

(58) Field of Classification Search
None
See application file for complete search history.

(56) References Cited

U.S. PATENT DOCUMENTS

| 5,841,864 A | 11/1998 | Klayman et al. |
| 6,816,970 B2 | 11/2004 | Morgan et al. |

(Continued)

FOREIGN PATENT DOCUMENTS

EP 2362951 B1 * 9/2013 .......... G05D 1/0027

OTHER PUBLICATIONS

M. Juliato, C. Gebotys and I. A. Sanchez, "On the specification of symmetric key management parameters for secure space missions," 2012 IEEE First AESS European Conference on Satellite Telecommunications (ESTEL), Rome, 2012, pp. 1-6, doi: 10.1109/ESTEL.2012.6400149. (Year: 2012).*

(Continued)

*Primary Examiner* — Madhuri R Herzog
(74) *Attorney, Agent, or Firm* — Sunstein LLP

(57) ABSTRACT

A system and method operate on a first electronic device and a second electronic device. The first device has a control system and a cryptographic communications module. The second device has a key generator, a user interface, and a cryptographic communications module. The second device generates a single-mission cryptographic key that is securely programmed into the first device, and the first device is deployed to a remote location. The user interface receives a command for controlling the first device. The second device encrypts the command according to the cryptographic key, and transmits the encrypted command to the first device. The first device authenticates the command, decrypts it, and passes the decrypted command to the control system. The first device may be actively guided ordnance, and the second device may be a control element for controlling the actively guided ordnance. The key may be automatically obfuscated upon mission completion or termination.

8 Claims, 6 Drawing Sheets

Related U.S. Application Data of application No. 14/660,373, filed on Mar. 17, 2015, now Pat. No. 9,871,772.

(52) U.S. Cl.
CPC ........ *H04L 63/0442* (2013.01); *H04L 63/062* (2013.01); *H04L 63/12* (2013.01)

(56) References Cited

U.S. PATENT DOCUMENTS

| | | | |
|---|---|---|---|
| 7,383,440 B1* | 6/2008 | Miller, III | H04L 9/3271 709/217 |
| 2004/0077335 A1 | 4/2004 | Lee et al. | |
| 2008/0091617 A1 | 4/2008 | Hazel et al. | |
| 2008/0184031 A1 | 7/2008 | McGough | |
| 2010/0228976 A1* | 9/2010 | Lee | H04L 63/062 713/168 |
| 2011/0231923 A1 | 9/2011 | Bollay et al. | |
| 2013/0138961 A1 | 5/2013 | Tsuji et al. | |
| 2014/0010371 A1 | 1/2014 | Khazan et al. | |
| 2014/0229735 A1 | 8/2014 | Holleis | |

OTHER PUBLICATIONS

Aiello et al., "Just Fast Keying: Key Agreement in a Hostile Internet," ACM Transactions on Information and System Security, vol. 7, No. 2, pp. 1-30, May 2004.

Barker, "Suite B Cryptography," NIST, Computer Security Division, ISPAB: Mar. 2006 Meeting, Rockville, MD, 16 pages, Mar. 22, 2006.

Blaze et al., "A Formal Treatment of Remotely Keyed Encryption (Extended Abstract)," Eurocrypt '98, International Conference on the Theory and Application of Cryptographic Techniques, Espoo, Finland, part of the Lecture Notes in Computer Science, vol. 1403, pp. 251-265, 1998.

Department of Defense, "Encryption of Imagery Transmitted by Airborne Systems and Unmanned Aircraft Control Communications (U)," Department of Defense Instruction, No. S-4660.04, 11 pages, Jul. 27, 2011.

Department of Defense, "DoD Information Security Program: Marking of Classified Information," Department of Defense Manual, No. 5200.01, vol. 2, 117 pages, Feb. 24, 2012.

Marty, "Vulnerability Analysis of the Mavlink Protocol for Command and Control of Unmanned Aircraft," AFIT-ENG-14-M-50, Department of the Air Force, Air Force Institute of Technology, Graduate School of Engineering and Management, Wright-Patterson Air Force Base, Ohio, 142 pages, 2013.

Răcuciu et al., "Embedded Real-Time Video Encryption Module on UAV Surveillance Systems," WSEAS Transactions on Circuits and Systems, World Scientific and Engineering Academy and Society, Stevens Point, Wisconsin (ISSN: 1109-2734) vol. 7, Issue 5, pp. 368-381, May 2008.

Schneier, "Applied Cryptography, Protocols, Algorithms, and Source Code in C (clot)", Second Edition, John Wiley & Sons, 748 pages, Jan. 1, 1996.

\* cited by examiner

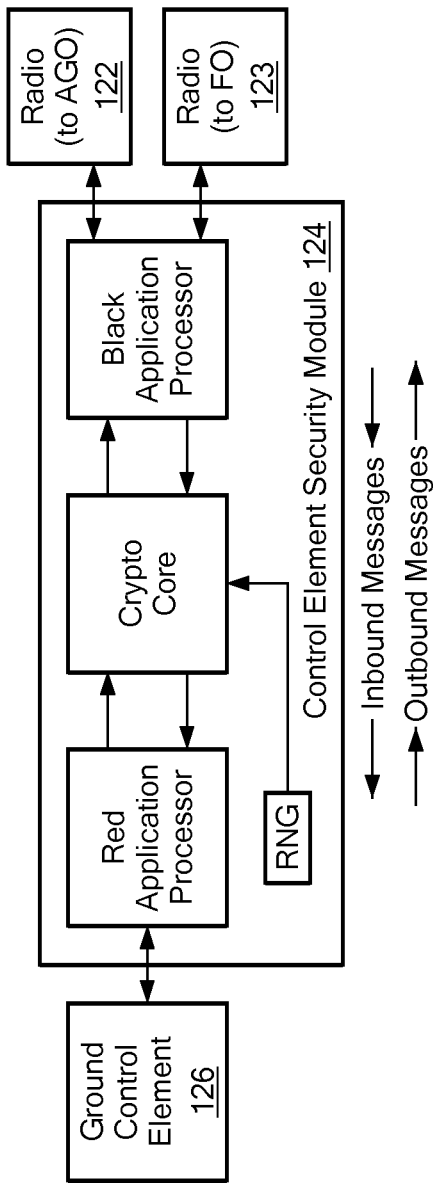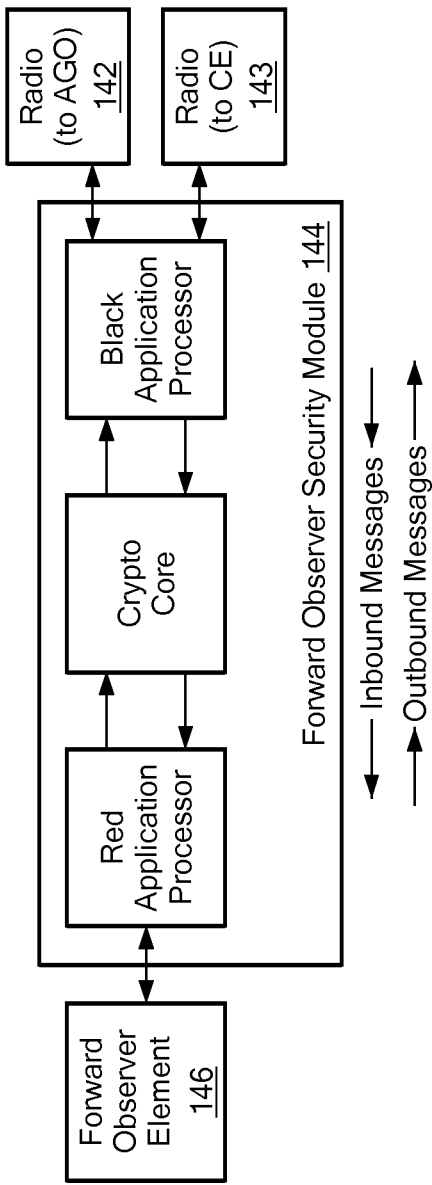
FIG. 5A
FIG. 5B

CRYPTOGRAPHIC SYSTEM FOR SECURE COMMAND AND CONTROL OF REMOTELY CONTROLLED DEVICES

CROSS-REFERENCE TO RELATED APPLICATION(S)

This patent application is a divisional of U.S. patent application Ser. No. 15/834,508 filed Dec. 7, 2017, which in turn is a divisional of U.S. patent application Ser. No. 14/660,373 filed Mar. 17, 2015, which is now U.S. Pat. No. 9,871,772, issued Jan. 16, 2018. Each of these above-described applications is hereby incorporated herein by reference in its entirety.

TECHNICAL FIELD

The present invention relates to communication systems using cryptography, and more particularly to remote control of a target device using a short term cryptographic key.

BACKGROUND ART

Modern weapons systems include ordnance that is both large and small. Large ordnance includes anti-aircraft, anti-ship, and anti-missile missiles, for example. Large ordnance is often expensive, and therefore includes guidance technology to ensure that it strikes its target. This guidance technology has been moving into small ordnance, such as small weaponized unmanned aerial vehicles (UAVs) and unpowered, steerable ordnance launched from conventional guns or railguns. However, smaller ordnance does not have the same space, power, or budgetary availability as large ordnance, so providing guidance systems is challenging.

NSA recently introduced the notion of Cryptographic High Value Product (CHVP) and allowed operational key material (keys used to encrypt/decrypt operational messages) to be generated within the crypto system itself rather than being generated within NSA and transferred to the operational environment.

CHVP is a designation used to identify assets that have high value, and which may be used to encrypt/decrypt secure communications, but which do not retain or store any classified information. When disconnected from the secure communication network, the CHVP equipment may be handled with a lower level of controls than required for COMSEC equipment. Because CHVP devices employ Suite B cryptographic algorithms as discussed at https://www.nsa.gov/ia/programs/suiteb_cryptography, they are categorized as non-Cryptographically Controlled Items (non-CCI). This is critical for their use in guided weapons, as such devices would be unrecoverable, for example, if the weapon failed to detonate.

CHVP implementations differ operationally from traditional cryptographic systems in that the users do not load operational keys from a CCI key fill device. Rather, the operational keys are generated from within the crypto system itself. The elements of the crypto system exchange operational keys and authenticate themselves to each other using asymmetric encryption techniques (e.g., Diffie-Hellman key exchange and digital signatures) where the asymmetric key pairs are provided using NSA certified Public Key Infrastructure (PKI). Generally speaking, CVHP devices are considered unclassified when unkeyed but when keyed assumes the classification level equal to that of the keying material used. NSA KG-84A and KG-84C cryptographic devices are examples of CCI devices that are considered unclassified when unkeyed. The IPS-250 CHVP High-Speed IP Network Encryptor from ViaSat is an example of a non-CCI cryptographic device that complies with NSA CHVP Suite B.

The Air Force Lifecycle Management Center (AFLCMC), Cryptologic Systems Division (CPSD), COMSEC Products Branch (HNCC), Joint Base San Antonio—Lackland, Tex., recently sought feedback from Industry on several requirements documentation for a Suite B based, NSA Type 1 (available and under development) certified or certifiable Mini Cryptographic (MC) devices for Secret and Below information protection. The cryptographic device will need to be capable of meeting highly optimized Size, Weight, and Power (SWaP) constraints while supporting modest data throughput. AFLCMC/HNCC envisions MC to be an embeddable module, however alternate solutions may be considered for installation. Embedment/installation will be required to operate within a system employing advanced electronic technology.

Moreover, the Department of Defense has issued a policy that requires communications to weaponized platforms and actively guided ordnance to be protected by NSA-certified Type 1 cryptographic devices. For example, DoD Instruction S4660.04 27 Jul. 2011—Subject: Encryption of Imagery Transmitted by Airborne Systems and Unmanned Aircraft Control Communications states that "Aircraft control communications of UAS' that carry kinetic weapons shall be encrypted with NSA/CSS certified Type 1 encryption" and also states that telemetry used to test actively guided ordnance (AGO) devices is likely to be classified, and can be expected to fall under this directive.

However, available Type 1 cryptographic devices are unsuitable in smaller guided ordnance, for a number of reasons. First, as cryptographically controlled items, they must be under positive physical control, or otherwise inaccessible to unauthorized entities, at all times, and this is impractical for smaller ordnance. Second, such devices are clearly not suitable to weaponized UAVs or other small guided ordnance, because there is an unacceptable risk that the crypto device would become physically accessible to an adversary in case of a failed detonation. Third, while existing devices may be useful for larger ordnance, they are too large to be embedded into a small guided round. Finally, existing systems must obtain encryption and decryption keys and related cryptographic data directly from the NSA, or obtain credentials from the Department of Defense. Once ordnance has been programmed with these keys, it cannot be changed for security reasons. These keys are typically signed using a certificate designed to expire after a period of time, with expiration of the certificate rendering useless any ordnance that has been programmed with the outdated keys, thereby incurring large logistical costs.

There is therefore a need for a small, low-power, security-certifiable system for controlling actively guided ordnance.

SUMMARY OF THE EMBODIMENTS

A system and method disclosed herein for providing communications security for small, low-power systems that are actively and securely controlled over a wireless data link addresses the problems faced by prior art systems. Useful embodiments include weapons and weaponized delivery devices that are actively steered or have the ability to be retargeted via a wireless link after they have been launched. The invention also may be embodied in safety-critical command and control for remote detonation; for example, for weapon and munitions disposal, and other applications for which a high level of security is required to prevent malicious and unintended intercept and spoofing of commands. Illustrative embodiments of the invention are described in the context of providing security for actively guided weapons. However, without loss of generality, the invention could be embodied in any system or application for which the elements that are being controlled are initialized in a manner that permits cryptographic initialization and key insertion to be authenticated locally; i.e. systems for which a man in the middle attack at initialization is not a practical threat.

One embodiment of the invention is a system for managing encryption keys and secure communications for a mission for a remotely controlled device (RCD), wherein the remotely controlled device can be stored unkeyed and can be keyed at the time of deployment. The system includes a primary control element (PCE) configured to (a) obtain indicia from the remotely controlled device; (b) obtain an RCD public key associated with the remotely controlled device based on the indicia; (c) generate a first operational keyset including a first single-mission encryption key for the remotely controlled device; (d) encrypt at least a portion of the first operational keyset using the RCD public key to form an encrypted first operational keyset; (e) transmit the encrypted first operational keyset to the remotely controlled device over a key load interface; (f) encrypt a first command for the remotely controlled device using a PCE in-use encryption key derived from the first single-mission encryption key; and (g) transmit the encrypted first command to the remotely controlled device along with an authentication tag over a first wireless communication link. The system also includes the RCD including said indicia and configured to (a) receive the encrypted first operational keyset over the key load interface; (b) decrypt the encrypted first operational keyset using an RCD private key associated with the RCD public key in order to obtain the first single-mission encryption key; (c) receive the encrypted first command over the first wireless communication link; (d) authenticate the encrypted first command using the authentication tag and a pre-loaded hash key; and (e) decrypt the encrypted first command using a first RCD in-use encryption key derived from the obtained first single-mission encryption key, wherein the primary control element changes the PCE in-use key and the remotely controlled device changes the first RCD in-use key in a coordinated manner at predetermined intervals so that only a limited number of commands can be encrypted using a given version of such in-use keys.

In various alternative embodiments, the indicia may include an identifier of the RCD or may include the public key associated with the RCD. The indicia may be placed on an outer surface of the RCD in which case the PCE may include an optical reader for reading the indicia from the outer surface of the RCD, or the indicia may be included in a near-field readable device of the RCD in which case the PCE may include a near-field reader for reading the indicia from the near-field readable device of the RCD.

Furthermore, the PCE and the RCD may be configured to respectively change the PCE in-use key and the RCD in-use key every N messages between the PCE and the RCD, where N is greater than or equal to one. The PCE may include a message counter in messages sent by the PCE to the RCD, in which case the PCE and the RCD may be configured to respectively change the PCE in-use key and the RCD in-use key based on the message counter.

Additionally, the RCD may be configured to move at least a portion of the operational keyset from a non-volatile memory into a volatile memory and erase such portion from the non-volatile memory during the mission. The PCE may be further configured to digitally sign the encrypted first operational keyset transmitted to the remotely controlled device over the key load interface. The PCE and the RCD may include identical hardware cryptographic modules. Each cryptographic module may include at least one first microprocessor configured to encrypt data using a single-mission cryptographic key, a second microprocessor, configured to transmit and receive encrypted data using a public data communications medium, and a third microprocessor, coupled to the at least one first microprocessor and to the second microprocessor, the third microprocessor configured (a) to determine whether encrypted data received from the at least one first microprocessor are correctly encrypted, and if so, to provide these data to the second microprocessor for transmission, and (b) to determine whether a command received from the second microprocessor is authentic, and if so, to decrypt the received command using the single-mission cryptographic key.

In certain embodiments, the system may further comprise a forward observer control element (FO), wherein the primary control element is further configured to (a) generate a second operational keyset including a second single-mission encryption key for the remotely controlled device; (b) encrypt at least a portion of the second operational keyset using an FO public key associated with the FO and transmit such encrypted second operational keyset to the FO; and (c) encrypt at least a portion of the second operational keyset using the RCD public key associated with the RCD and transmit such encrypted second operational keyset to the RCD; the forward observer control element is configured to (a) receive the encrypted second operational keyset from the PCE; (b) decrypt the encrypted second operational keyset using an FO private key associated with the FO public key in order to obtain the first single-mission encryption key; and (c) encrypt a second command for the RCD using an FO in-use key derived from the second single-mission encryption key and transmit the encrypted second command to the RCD over a second wireless communication link; and the remotely controlled device is further configured to (a) receive the encrypted second operational keyset from the PCE; (b) decrypt the encrypted second operational keyset using an RCD private key associated with the RCD public key in order to obtain the second single-mission encryption key; (c) receive the encrypted second command from the FO over the second wireless communication link; and (d) decrypt the encrypted second command using a second RCD in-use key derived from the second single-mission encryption key, wherein the forward observer control element changes the FO in-use key and the remotely controlled device changes the second RCD in-use key in a coordinated manner at predetermined intervals so that only a limited number of commands can be encrypted using a given version of such in-use keys. In such embodiments, the PCE may be configured to perform a secure hand-off procedure to allow the FO to send the second command to the RCD. The encrypted second command may include an indicator associated with the second operational keyset to allow the RCD to select the second operational keyset from among a plurality of operational keysets for use in decrypting the encrypted second command. The PCE, the FO, and the RCD may include identical hardware cryptographic modules. Each cryptographic module may include at least one first microprocessor configured to encrypt data using a single-mission cryptographic key, a second microprocessor, configured to transmit and receive encrypted data using a public data communications medium, and a third microprocessor, coupled to the at least one first microprocessor and to the second microprocessor, the third microprocessor configured (a) to determine whether encrypted data received from the at least one first microprocessor are correctly encrypted, and if so, to provide these data to the second microprocessor for transmission, and (b) to determine whether a command received from the second microprocessor is authentic, and if so, to decrypt the received command using the single-mission cryptographic key.

In certain embodiments, the primary control element may be configured for controlling multiple remotely controlled devices simultaneously including, for each remotely controlled device, (a) obtaining indicia from the remotely controlled device; (b) obtaining an RCD public key associated with the remotely controlled device based on the indicia; (c) generating a first operational keyset including a first single-mission encryption key for the remotely controlled device; (d) encrypting at least a portion of the first operational keyset using the RCD public key to form an encrypted first operational keyset; (e) transmitting the encrypted first operational keyset to the remotely controlled device over a key load interface; (f) encrypting a first command for the remotely controlled device using a PCE in-use encryption key derived from the first single-mission encryption key; and (g) transmitting the encrypted first command to the remotely controlled device along with an authentication tag over a wireless communication link. In such embodiments, the system may further comprises a plurality of forward observer control elements, in which case the primary control element may be configured for selectively performing a plurality of secure hand-off procedures wherein different remotely controlled devices are handed off to different forward observer control elements.

Another embodiment of the invention is a control element (CE) for managing encryption keys and secure communications for a mission for a remotely controlled device (RCD), wherein the remotely controlled device can be stored unkeyed and can be keyed at the time of deployment. The control element includes a scanner configured to (a) obtain indicia from the remotely controlled device. The control element also includes a cryptographic module configured to (b) obtain an RCD public key associated with the remotely controlled device based on the indicia; (c) generate a first operational keyset including a first single-mission encryption key for the remotely controlled device; (d) encrypt at least a portion of the first operational keyset using the RCD public key to form an encrypted first operational keyset; (e) transmit the encrypted first operational keyset to the remotely controlled device over a key load interface; (f) encrypt a first command for the remotely controlled device using a CE in-use encryption key derived from the first single-mission encryption key; and (g) transmit the encrypted first command to the remotely controlled device along with an authentication tag over a first wireless communication link, wherein the control element changes the CE in-use key at predetermined intervals so that only a limited number of commands can be encrypted using a given version of such in-use keys.

In various alternative embodiments, the indicia may include at least one of an identifier of the RCD or the public key associated with the RCD. The scanner may include an optical reader for reading the indicia from an outer surface of the RCD or a near-field reader for reading the indicia from a near-field readable device of the RCD. The control element may be configured to change the CE in-use key every N messages between the CE and the RCD, where N is greater than or equal to one. The control element may be further configured to digitally sign the encrypted first operational keyset transmitted to the remotely controlled device over the key load interface. The cryptographic module may include at least one first microprocessor configured to encrypt data using a single-mission cryptographic key, a second microprocessor, configured to transmit and receive encrypted data using a public data communications medium, and a third microprocessor, coupled to the at least one first microprocessor and to the second microprocessor, the third microprocessor configured (a) to determine whether encrypted data received from the at least one first microprocessor are correctly encrypted, and if so, to provide these data to the second microprocessor for transmission, and (b) to determine whether a command received from the second microprocessor is authentic, and if so, to decrypt the received command using the single-mission cryptographic key.

In certain embodiments, the control element may be configured to perform a secure hand-off procedure to a forward observer control element (FO) to allow the FO to send encrypted commands to the RCD, and wherein the cryptographic module is further configured to (a) generate a second operational keyset including a second single-mission encryption key for the remotely controlled device; (b) encrypt at least a portion of the second operational keyset using an FO public key associated with the FO and transmit such encrypted second operational keyset to the FO; and (c) encrypt at least a portion of the second operational keyset using the RCD public key associated with the RCD and transmit such encrypted second operational keyset to the RCD.

In certain other embodiments, the control element may be configured for controlling multiple remotely controlled devices simultaneously including, for each remotely controlled device, the cryptographic module is further configured to (a) obtain indicia from the remotely controlled device; (b) obtain an RCD public key associated with the remotely controlled device based on the indicia; (c) generate a first operational keyset including a first single-mission encryption key for the remotely controlled device; (d) encrypt at least a portion of the first operational keyset using the RCD public key to form an encrypted first operational keyset; (e) transmit the encrypted first operational keyset to the remotely controlled device over a key load interface; (f) encrypt a first command for the remotely controlled device using a CE in-use encryption key derived from the first single-mission encryption key; and (g) transmit the encrypted first command to the remotely controlled device along with an authentication tag over a wireless communication link.

Another embodiment of the invention is a method for managing encryption keys and secure communications by a control element (CE) for a mission for a remotely controlled device (RCD), wherein the remotely controlled device can be stored unkeyed and can be keyed at the time of deployment. The method involves (a) obtaining indicia from the remotely controlled device; (b) obtaining an RCD public key associated with the remotely controlled device based on the indicia; (c) generating a first operational keyset including a first single-mission encryption key for the remotely controlled device; (d) encrypting at least a portion of the first operational keyset using the RCD public key to form an encrypted first operational keyset; (e) transmitting the encrypted first operational keyset to the remotely controlled device over a key load interface; (f) encrypting a first command for the remotely controlled device using a CE in-use encryption key derived from the first single-mission encryption key; and (g) transmitting the encrypted first command to the remotely controlled device along with an authentication tag over a first wireless communication link, wherein the control element changes the CE in-use key at predetermined intervals so that only a limited number of commands can be encrypted using a given version of such in-use keys.

In various alternative embodiments, the indicia may include at least one of an identifier of the RCD or the public key associated with the RCD. Obtaining indicia from the remotely controlled device may involve reading the indicia from an outer surface of the RCD or reading the indicia from a near-field readable device of the RCD. The method may further involve changing the CE in-use key every N messages between the CE and the RCD, where N is greater than or equal to one. The method also may further involve digitally signing the encrypted first operational keyset transmitted to the remotely controlled device over the key load interface.

In certain embodiments, the method may further involve (a) generating a second operational keyset for a forward observer control element (FO) including a second single-mission encryption key for the remotely controlled device; (b) encrypting at least a portion of the second operational keyset using an FO public key associated with the FO and transmitting such encrypted second operational keyset to the FO; (c) encrypting at least a portion of the second operational keyset using the RCD public key associated with the RCD and transmitting such encrypted second operational keyset to the RCD; and (d) performing a secure hand-off procedure to the FO to allow the FO to send encrypted commands to the RCD.

In other embodiments, the control element may be configured for controlling multiple remotely controlled devices simultaneously including, for each remotely controlled device, (a) obtaining indicia from the remotely controlled device; (b) obtaining an RCD public key associated with the remotely controlled device based on the indicia; (c) generating a first operational keyset including a first single-mission encryption key for the remotely controlled device; (d) encrypting at least a portion of the first operational keyset using the RCD public key to form an encrypted first operational keyset; (e) transmitting the encrypted first operational keyset to the remotely controlled device over a key load interface; (f) encrypting a first command for the remotely controlled device using a CE in-use encryption key derived from the first single-mission encryption key; and (g) transmitting the encrypted first command to the remotely controlled device along with an authentication tag over a wireless communication link.

Another embodiment of the invention is a remotely controlled device (RCD) that can be stored unkeyed and can be keyed at the time of deployment by a control element (CE). The remotely controlled device includes indicia readable by the CE from outside of the RCD and a cryptographic module that stores an RCD private key and is configured to (a) receive an encrypted first operational keyset from a control element over a key load interface, the encrypted first operational keyset including a first single-mission encryption key encrypted using an RCD public key associated with the RCD private key; (b) decrypt the encrypted first operational keyset using the RCD private key in order to obtain the first single-mission encryption key; (c) receive an encrypted first command from the CE over a first wireless communication link, the encrypted first command including information encrypted using a CE in-use encryption key derived from the first single-mission encryption key; (d) authenticate the encrypted first command using the authentication tag and a pre-loaded hash key; and (e) decrypt the encrypted first command using a first RCD in-use encryption key derived from the obtained first single-mission encryption key, wherein the remotely controlled device changes the first RCD in-use key at predetermined intervals so that only a limited number of commands can be encrypted using a given version of such in-use keys.

In various alternative embodiments, the RCD may further include a near-field readable device containing the indicia. The cryptographic module may be configured to change the RCD in-use key every N messages between the PCE and the RCD, where N is greater than or equal to one. The cryptographic module may be configured to move at least a portion of the operational keyset from a non-volatile memory into a volatile memory and erase such portion from the non-volatile memory during the mission. The cryptographic module may include at least one first microprocessor configured to encrypt data using a single-mission cryptographic key, a second microprocessor, configured to transmit and receive encrypted data using a public data communications medium, and a third microprocessor, coupled to the at least one first microprocessor and to the second microprocessor, the third microprocessor configured (a) to determine whether encrypted data received from the at least one first microprocessor are correctly encrypted, and if so, to provide these data to the second microprocessor for transmission, and (b) to determine whether a command received from the second microprocessor is authentic, and if so, to decrypt the received command using the single-mission cryptographic key.

Yet another embodiment of the invention is a method for controlling a remotely controlled device (RCD) that can be stored unkeyed and can be keyed at the time of deployment by a control element (CE), the RCD having an RCD private key. The method involves (a) receiving an encrypted first operational keyset from a control element over a key load interface, the encrypted first operational keyset including a first single-mission encryption key encrypted using an RCD public key associated with the RCD private key; (b) decrypting the encrypted first operational keyset using the RCD private key in order to obtain the first single-mission encryption key; (c) receiving an encrypted first command from the CE over a first wireless communication link, the encrypted first command including information encrypted using a CE in-use encryption key derived from the first single-mission encryption key; (d) authenticating the encrypted first command using the authentication tag and a pre-loaded hash key; and (e) decrypting the encrypted first command using a first RCD in-use encryption key derived from the obtained first single-mission encryption key, wherein the remotely controlled device changes the first RCD in-use key at predetermined intervals so that only a limited number of commands can be encrypted using a given version of such in-use keys.

In various alternative embodiments, the method may further involve changing the RCD in-use key every N messages between the CE and the RCD, where N is greater than or equal to one. The method may further involve moving at least a portion of the operational keyset from a non-volatile memory into a volatile memory and erase such portion from the non-volatile memory during the mission.

Still another embodiment of the invention is a cryptographic module for use in a system providing a short-term, high-security communications link over a public data communications medium. The cryptographic module includes at least one first microprocessor configured to encrypt data using a single-mission cryptographic key, a second microprocessor, configured to transmit and receive encrypted data using a public data communications medium, and a third microprocessor, coupled to the at least one first microprocessor and to the second microprocessor, the third microprocessor configured (a) to determine whether encrypted data received from the at least one first microprocessor are correctly encrypted, and if so, to provide these data to the second microprocessor for transmission, and (b) to determine whether a command received from the second microprocessor is authentic, and if so, to decrypt the received command using the single-mission cryptographic key.

BRIEF DESCRIPTION OF THE DRAWINGS

The foregoing features of embodiments will be more readily understood by reference to the following detailed description, taken with reference to the accompanying drawings, in which:

FIGS. 5(A)-(C) are schematic diagrams of a cryptographic module and related components in accordance with one exemplary embodiment of the present invention, including a representation FIG. 5(A) of the cryptographic module embedded in a control element, a representation FIG. 5(B) of the cryptographic module embedded in a forward observer, and a representation FIG. 5(C) of the cryptographic module embedded in an actively guided ordnance.

DETAILED DESCRIPTION OF SPECIFIC EMBODIMENTS

Figure 1:
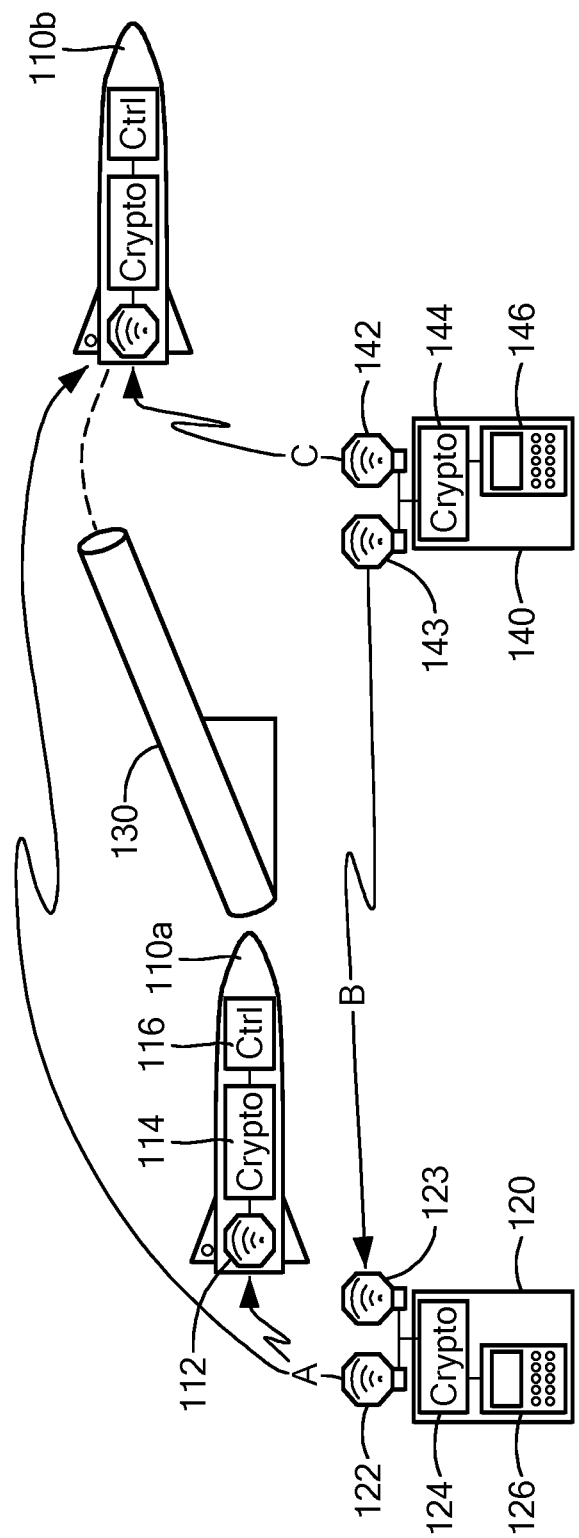
FIG. 1 presents an overview of an active guided ordnance ("AGO") weapons system having secure communications.

As used in this description and the accompanying claims, the following terms shall have the meanings indicated, unless the context otherwise requires:

"Public data communications medium" is any data communications medium that is available for public use, and includes wireless radio frequency communications.

A "remotely controlled device" or "RCD" means a device that is remotely controlled over a communication system that includes a public or insecure communication medium such as, for example, a wireless communication medium or the Internet. RCDs may be mobile or stationary devices and may require remote control for any of a wide range or remote control functions (e.g., activation, propulsion, steering, trajectory, aiming, operation, launch, detonation, etc.). Without limitation, exemplary embodiments are described below with reference to systems in which the RCDs are any of various types of actively guided ordnance (AGO). "Actively guided ordnance" or "AGO" means any type of remotely controlled ordnance (e.g., weapons, ammunition, combat vehicles, equipment, etc.), whether large or small, mobile or stationary, powered or unpowered, that is controlled by receiving guidance commands from an external source. Thus, for example, an AGO may be a projectile (e.g., a missile, bomb, artillery shell, rocket propelled grenade, bullet, torpedo, etc.), a remote-controlled vehicle (e.g., an Unmanned Aerial Vehicle or UAV—often referred to as a drone, helicopter, truck, tank, boat, submarine, etc.), a robot, or even a device that is deployed and remains stationary (e.g., a camera, mine, detonator, etc.). Thus, in the context of an AGO, the term "guided" or "guidance" does not require controlling movement of the ordnance but more generally covers any type of remote communication and/or control with the ordnance. Generally speaking, an RCD may include multiple types of remotely controlled subsystems, such as, for example, a control subsystem that requires commands for activation, deactivation, or configuration/programming; a propulsion subsystem that requires commands for starting, stopping, or navigation; a weapons subsystem that requires commands for aiming, firing, or detonating a weapon; an audio and/or video subsystem that requires commands for focusing or activation, a display subsystem that requires commands for conveying messages to a user or attached device, etc.

A "cryptographic key," or simply "key," is data that determines the output of a cryptographic algorithm for encrypting and decrypting data for use by participating parties or devices. In "symmetric cryptography," a common encryption key is used by one device to encrypt information and by another device to decrypt the encrypted information. In "asymmetric cryptography" (also known as "public key cryptography"), a participant has a "public key" that may be publicly distributed, and a "private key" known only to the participant. The public key and the private key are mathematically linked to permit encryption of data using the public key by anyone, but decryption of data using the private key only by the participant. A "public key certificate" (also "digital certificate" or just "certificate") is a collection of data used to provably associate, or bind, a public key to a participant, thereby combating forged communications. A "public key infrastructure" or "PKI" is a system for creating, maintaining, distributing, and revoking digital certificates. Many examples of private and public key cryptography principles and protocols are discussed in *Applied Cryptography: Protocols, Algorithms and Source Code in C*, Second Edition, by Bruce Schneier, Wiley (1996), which is incorporated herein by reference in its entirety A "single-mission cryptographic key" is a cryptographic key that is used for encrypting and/or decrypting sensitive data transmitted between electronic devices that are cooperating to accomplish a task of well-defined and limited scope.

A "condition" of an electronic device is a description of a state of the device, and may include without limitation: a geographic position of the device, a movement vector of the device, an audiovisual representation of the environment of the device, or a condition of any component or subsystem of the device.

The term "upstream" refers to communications from a control element to the AGO.

The term "downstream" refers to communications from the AGO to a control element.

An actively guided ordnance is part of a weapon system having several components. One such component is a primary control element (CE), typically proximate to the ordnance point of launch, used for providing guidance data to the AGO from a great distance. Another such component is one or more forward observers (FO) that can retarget the AGO based on information proximate to a target. While en route to the target, the AGO may receive steering commands or targeting updates from its control element (CE) or a forward observer (FO), and may send video or data telemetry information back to the control element or forward observer(s).

These components must communicate with each other using secure data channels. In particular, AGO system communications need to be protected so that an adversary cannot issue forged commands to the AGO, or observe the communications and learn anything about the intended target. Non-forgeability is an absolute requirement in all cases. Video from an AGO used to steer it to the target, or telemetry from an AGO, may be classified, or otherwise require confidentiality if an adversary may have time to react to the observed information, although confidentiality may be less critical if neither of these situations exists.

Although different types of AGOs can be vastly different from one another physically and in the manner they are guided and controlled, from a security standpoint, AGO systems generally share the following operational characteristics:

1. An AGO mission is short. Times from launch of an AGO device to mission termination range from a few minutes for a guided shell to no more than an hour or so for a small weaponized UAV.

2. An AGO device is used for a single mission. Cryptographic keys and related data (referred to hereinafter as "operational keymat"), including any public key credentials, are used only once.

3. An AGO device, once launched, is not recovered by its owner. A successful mission results in destruction of the AGO device and its associated cryptographic module. However, if an AGO device fails to detonate, then it may be obtained by an adversary.

4. An AGO weapons system is self-contained and communicates only with one or more designated control elements, which often may communication with more than one AGO at a time.

5. An AGO device is under physical control of the user from the time operational keymat is loaded into the AGO until launch of the AGO.

6. An AGO device, while en route to its target, is physically inaccessible to an adversary. Once in the air, various side-channel attacks, such as differential power analysis, cannot be readily performed by an adversary.

Often, AGOs are pre-programmed with operational keymat used to authenticate and encrypt communications from a control element to the AGO (e.g., commands and data to control the AGO such as for targeting) and optionally also communications from the AGO to the control element (e.g., video and/or telemetry data). Per U.S. government encryption standards, AGOs having pre-programmed operational keymat must be stored securely in order to prevent unauthorized access to the operational keymat. Furthermore, security must be maintained throughout transportation and firing of the AGOs.

Embodiments of the present invention allow AGOs to be stored and transported in a non-secure manner until they are ready to be deployed or fired. Specifically, the AGOs contain no operational keymat during storage and transportation and therefore can be stored and transported in a non-secure manner. If an AGO were to fall into an adversary's hands at this time, the adversary would be unable to obtain any secret encryption key information. When the AGO is being prepared for firing, the AGO is provided with operational keymat by a primary control element in a secured manner including one or more single-mission cryptographic keys used for encrypted communications between the AGO and the primary control element, as discussed below. This generally occurs at or near the point of launch as part of the AGO initialization, while the AGO is in physical proximity to the primary control element, such that an adversary has no practical way to observe, or execute a man-in-the-middle attack on, the loading of the operational keymat into the AGO.

The operational keymat is unique to an individual AGO (although in some embodiments multiple rounds fired as a phalanx at a single target may share the same operational keymat) and is valid until the AGO (or AGO phalanx) reaches its target. That time frame may be as long as tens of minutes for a weaponized UAV to as short as a few minutes or even seconds for a guided round. If the AGO detonates properly, the operational keymat should be physically destroyed along with the embedded cryptographic device. As discussed below, in certain exemplary embodiments, if the AGO fails to detonate, any operational keymat remaining on the cryptographic device (e.g., one or more encryption keys used for symmetric key encryption of communications, the private key of the AGO's key agreement credential) should be of little or no value to the adversary, as it generally cannot be used for anything other than possibly recovering past communications to and/or from the unexploded AGO (e.g., the sequence of control commands sent to the AGO, video and/or telemetry data sent by the AGO, etc.). An adversary may attempt to create a valid AGO credential by recovering the private key, but this is very hard to do and is of no utility to the adversary if a certificate is not exchanged over the air.

In certain exemplary embodiments, an AGO communicates only with a single control element at any time during its mission—although that communication may shift from the primary element to a forward observer (FO) as the AGO moves toward its target. A control element may communicate with multiple AGOs. A forward control element receives operational keymat over a secure channel. This channel may be implemented using the AGO encryption system or some other system. In the case of guided rounds, with one-way communication to the rounds from the CE or FO. Two-way communications will be required for those cases where guidance of the AGO is based on video or telemetry information from the AGO.

FIG. 1 presents an overview of an active guided ordnance ("AGO") weapons system having secure communications, in accordance with various embodiments of the present invention. This system includes an actively guided ordnance ("AGO"), such as a guided missile, for destroying a target. In FIG. 1, the same physical ordnance is shown both pre-launch (with label 110a) and post-launch (with label 110b) to clarify the description. The weapons system also includes a primary control element 120, typically proximate to the AGO launcher 130, for preparing the AGO 110a for launch and optionally also for guiding the AGO 110b while in flight. This exemplary weapons system can include one or more optional forward observers (only one shown, although systems can include more than one forward observer) that can retarget the AGO using a forward observer (secondary) control element 140. The secondary control element 140 includes hardware that is similar to that of the primary control element 120.

Weapons System Components

The AGO 110a, 110b includes a radio subsystem 112 for communicating with the primary control element 120 using link A, and with the secondary control element 140 using link C while in flight. The primary control element 120 has a radio subsystem 122 for communicating with the AGO 110a, 110b using link A and has a radio subsystem 123 for communicating with the secondary control element 140 using link B. The secondary control element 140 has a radio subsystem 143 for communicating with the primary control element 120 using link B and has a radio subsystem 142 for communicating with the in-flight AGO 110*b* using link C. The radio subsystem 112 is physically contained within the body of the AGO 110*a*, 110*b*; however, the radio subsystems 122/123 and 142/143 may be located internally or externally to the respective control elements 120 and 140. The radio subsystems 112, 122, 123, 142, and 143 may be implemented using radio technology that is known in the art, such as, for example, cellular, satellite, microwave, etc. The radio subsystems 123 and 143 may, and typically do, use different communication technology than the radio subsystems 112, 122 and 142.

The AGO 110*a*, 110*b* includes a cryptographic module 114 for performing cryptographic operations in accordance with an embodiment of the invention. Likewise, the primary control element 120 has a similar cryptographic module 124, and the secondary control element 140 has a similar cryptographic module 144. These cryptographic modules cooperate to provide cryptographic security to sensitive information that is transmitted on the links A, B, and C. An exemplary cryptographic module that can be embedded in the control element(s) and AGO(s) is shown and described schematically in connection with FIG. 5, and is discussed more fully below. An exemplary architecture 200 for such cryptographic modules is shown and described in connection with FIG. 2, and is discussed more fully below. An exemplary method 300 of initializing the cryptographic modules is shown and described in connection with FIG. 3, and is discussed more fully below.

The AGO 110*a*, 110*b* also includes a control system 116. The control system 116 controls the operation of the AGO 110*a*, 110*b*, and may be implemented using a combination of hardware and firmware or software. The hardware may control the guidance of the AGO by actuating its guidance control surfaces and providing computational systems, while the firmware and software may provide computational algorithms for navigation, and include a control subsystem for processing navigational data and issuing guidance commands to the hardware. The control system 116 also may be operated by receiving, from the primary control element 120 and/or the secondary control element 140 via the radio subsystem 112, commands for controlling the AGO 110*a*, 110*b*, provided those commands are properly authenticated and decrypted using a single-mission cryptographic key in the cryptographic module 114. An exemplary method 400 of using the cryptographic modules 114, 124 in conjunction with the control system 116 to control the AGO 110*a*, 110*b* before and during flight is shown and described in connection with FIG. 4.

The primary control element 120 includes a control system 126 including a user interface. The control system 126 controls all encryption keying operations for the AGO weapons system and also allows a user to send encrypted commands to the AGO (or alternatively some commands may be generated by the control system 126 autonomously as a result of computations made on the basis of the information about the AGO 110*a*, 110*b*), optionally receive encrypted data from the AGO (e.g., video data and/or telemetry data), and hand off control of the AGO to the secondary control element 140, among other things.

The primary control element 120 typically includes a key generator (e.g., as part of the control system 126) for generating various encryption keys used for encrypted communications with the AGO, as discussed below. Keys may be generated in any of a variety of ways, e.g., using an internal or external random number generator to produce random or pseudo-random numbers to use as keys or as seed values for generating keys (e.g., using a hash function).

The secondary control element 140 also includes a control system 146 including a user interface that allows a user to send encrypted commands to the AGO (or alternatively some commands may be generated by the control system 146 autonomously as a result of computations made on the basis of the information about the AGO 110*a*, 110*b*) and optionally receive encrypted data from the AGO (e.g., video data and/or telemetry data).

Communication Paradigm

In order to prepare an AGO for launch, the primary control element 120 must load operational keymat into the AGO and also into any forward observer control element(s) such as the secondary control element 140 of FIG. 1. In certain exemplary embodiments, the operational keymat includes one or more "keysets," where a keyset includes an single-mission encryption key and other information (discussed below) used for unidirectional encrypted communications over a particular communication link. Thus, for example, operational keymat may include one keyset for encrypted communications from the primary control element 120 to the AGO, another keyset for encrypted communications from the AGO back to the primary control element (if bi-directional communications are supported for the particular AGO), another keyset for encrypted communications from the secondary control element 140 to the AGO (if the AGO is permitted to be controlled by a forward observer), another keyset for encrypted communications from the AGO to the secondary control element 140, and so on, depending on how may forward observers are included in the system. The primary control element 120 generates the keysets and transmits the keysets to the AGO, as discussed below. The primary control element 120 also sends the relevant keysets to each forward observer control element. Once the AGO and any forward observer(s) have been loaded with keyset(s), the control element(s) can begin having encrypted communications with the AGO.

The AGO maintains the keysets in its memory. In exemplary embodiments, each keyset is associated with a keyset identifier (e.g., a keyset number), and encrypted commands sent to the AGO by the CE and FO(s) generally includes the identifier of the keyset that was used to encrypt the command, thereby allowing the AGO to use the proper keyset for decrypting the command.

In certain exemplary embodiments, the single-mission encryption key conveyed in a particular keyset is used as an initial key that is changed (rolled over) from time to time throughout the mission, preferably every N messages, where N is greater than or equal to one. Thus, for each link/direction, an in-use key is maintained by the AGO and the corresponding control element. Each link/direction is associated with a current key, which is initially the key conveyed in the keyset and in certain exemplary embodiments is changed from time to time throughout the mission, as discussed below.

The weapons system is preferably designed so that operational keymat is automatically obfuscated (e.g., erased, overwritten, zeroized, randomized, rolled over, etc.) in the AGO in the event the mission ends without destruction of the AGO. Rather than including extraordinary anti-tamper or zeroization measures to protect operational keymat on AGOs (e.g., using an accelerometer or barometric altimeter to determine that the mission ended without detonation and destroying the operational keymat or the AGO), certain exemplary embodiments update and overwrite some or all of the operational keymat periodically such as by hashing some or all of the existing operational keymat periodically at both ends of the communication link (e.g., every N messages based on a message counter passed by the control element in plaintext, where N can be any predetermined integer value) and overwriting the existing operational keymat with the hashed result. With such periodic updating of the operational keymat, any recovered operational keymat will not yet have been used or at worst will have been used to encrypt communications only over the last key update interval, and if the key is updated with every message, then the system essentially has full backwards secrecy.

Additionally or alternatively to periodically updating the operational keymat, the cryptographic module of the AGO may move some or all of the operational keymat, such as the single-mission encryption key(s), from a non-volatile memory (e.g., flash-programmable random access memory) into a volatile memory (e.g., dynamic random access memory or DRAM) and then erase such operational keymat from the non-volatile memory such that the eventual loss of electrical power from the AGO's battery will effectively erase the operational keymat from the AGO if the mission ends without destruction of the AGO. If the mission is aborted prior to launch, the AGO may be commanded to move the operational keymat from the volatile storage back into the non-volatile storage.

Also, in certain exemplary embodiments, each message transmitted in a particular direction on a particular communication link consists of an unencrypted portion (e.g., a header containing various data fields transmitted in cleartext) and one or more encrypted portions (referred to hereinafter for convenience as "blocks"), where each block is encrypted using a different encryption key based on the in-use key associated with the particular link/direction. Multiple blocks may be included in a single message, for example, to convey multiple and/or redundant commands in a single transmission. Many techniques for changing the effective encryption key relative to a base encryption key are known, e.g., using initialization vectors, message counters, block chaining, etc. Preferably, the technique used to change the effective encryption key is not based on any dependency between messages (such as occurs in cypher block chaining, for example) so that each message received by a device can be decrypted even if one or more predecessor messages are missing or corrupted.

Certain exemplary embodiments use a "counter mode" technique to generate the encryption key for each block based on the single-mission encryption key associated with that link/direction and other information, including a unique initialization vector ("IV") and a counter associated with that link/direction. Preferably, the IV is a 96-bit value and the counter is a 32-bit value, and these values are combined (e.g., appended) to form a 128-bit value. In order to encrypt or decrypt a particular block, the encryption key for that block is computed by combining the single-mission encryption key with the combined IV/counter, e.g., by an exclusive-OR operation.

In order to reduce the amount of information included in each message, the primary control element 120 preferably generates an IV for each link/direction and includes the IV in the corresponding keyset. Among other things, including the IV in the keyset avoids having to include the IV in each transmission (and also distributes the IVs in a secured manner, although IVs are generally not required to be hidden or encrypted in cryptographic protocols). Alternative embodiments may include an IV in each transmission.

In certain exemplary embodiments, the message counter is a combination of a three-byte explicit message counter included in the message (which is incremented each transmission) and a one-byte implicit block counter generated locally in the device (i.e., where the first block in a transmission can be considered block 0, the second block can be considered block 1, and so on). Among other things, this use of an explicit counter and an implicit counter reduces the amount of counter information included in each message, i.e., from four bytes to three bytes.

Keyset Generation

In certain exemplary embodiments, the primary control element 120 generates a new public/private key pair for each key exchange and also generates the single mission keys to be used by the CE and any FOs for encrypted communications with the AGO. In order to generate encryption keys, the CE may include a random number generator or may receive random number from an external random number generator. Because the AGO receives encryption keys from the CE, the AGO is not required to have a random number generator, thereby simplifying the AGO.

Once generated, the single-mission cryptographic key may need to be stored for a period of time by the control element 120. To prevent it from being misused, it should be stored securely (e.g., after being encrypted using a separate key encryption key ("KEK")) so that the single-mission cryptographic key may be accessed only upon receiving access authorization, for example, by way of a password entered into the control element 120. The key generator may generate any key needed to operate the secure communication links A and C (which may include different keys for different links and/or may include different keys for upstream and downstream communications between the AGO and a particular control element), and therefore may be conventionally manufactured in accordance with a cryptographic algorithm known in the art. For example, the algorithm may implement a stream cipher, where all commands and data are encrypted and decrypted using the same single-mission cryptographic key.

Key Load Paradigm

As discussed above, in order to prepare an AGO for launch, the primary control element 120 must load operational keymat into the AGO and also into any forward observer control element(s) such as the secondary control element 140 of FIG. 1. In certain exemplary embodiments, the key load operation involves an authenticated public key encryption (e.g., Diffie-Hellman) key exchange protocol in which the primary control element 120 encrypts the operational keymat using a public key associated with the AGO, digitally signs the encrypted operational keymat using a signing credential in the form of a digital signature certificate, and sends the digitally signed and encrypted operational keymat to the AGO. Preferably, this key exchange occurs over an interface other than the interface used to communicate over-the-air with the AGO (e.g., the operational keymat may be programmed directly into the AGO via a special interface on the AGO, may be programmed into the AGO via a near-field wireless interface such as RFID or infrared interface, or may be programmed into the AGO via the red side such as from cryptographic module 124 via control system 116 to cryptographic module 114, to name but a few), although the key exchange could occur over the same interface in some embodiments.

In order to be able to participate in the key exchange protocol, the AGO is associated with a unique public key and private key pair for use in communicating with the control element(s). The private key and optionally also the public key is stored within the AGO, particularly within the cryptographic module 114. Also, a root public key used to validate the digital signature certificate from the primary control element 120 is stored in the AGO. This information may be stored in the AGO during production of the AGO and in any case this information preferably is stored in such a way that it cannot be read out of storage electronically by a third party and instead is only usable by the cryptographic module of the cryptographic module 114 as discussed below.

The AGO's public key is made available to the control element 120, typically in a manner that allows the public key to be obtained by or read into the control element 120 electronically so that the AGO can be quickly loaded with operational keymat when being readied for firing. For example, the public key or other indicia (a unique identifier of the AGO that can be used to look up the AGO's public key in a database) may be placed on an outer surface of the AGO (e.g., printed or etched in the form of a bar code, QR code, etc.) or embedded in a near-field readable device such as an RFID device such that the public key or other indicia can be read or scanned into the control element 120, preferably over an interface other than the interfaces used to load operational keymat into the AGO and subsequently communicate over-the-air with the AGO, e.g., the control element 120 may include a scanner, RFID reader, or other device through which the public key is read or scanned. Alternatively, the public key or identifier may be entered into the primary control element 120 manually through the user interface of the control system 126.

The user interface can be made to display information about the AGO 110a, 110b. This information may be securely transmitted from the AGO 110a, 110b to the control element 120, and may include telemetry data and/or video data. Alternate or additional information about the AGO 110a, 110b may be obtained from other sources.

The AGO 110a, 110b may include a secondary interface for updating the firmware or software contained inside. In particular, the AGO interface may be used to update program code used by the cryptographic module 114, such as the cryptographic algorithm if the existing algorithm has been compromised (whether theoretically or practically). The AGO interface additionally or alternatively may be used for receiving the single-mission cryptographic key and programming it into the cryptographic module 114.

In a preferred embodiment, the key may only be received using a separate public key cryptographic algorithm, for example one using a key encryption key. In such an embodiment, the control element 120 may include a PKI certificate for authenticating it as a valid source of single-mission cryptographic keys. Each control element includes a digital certificate and uses the associated private key to cryptographically sign the message used to transfer the single-use operational key from the control element to the AGO.

Operational messages between elements of the system (CE, AGO, and FO) are authenticated with a keyed hash function (e.g., HMAC or CBC MAC) where the key for the hash function is contained in the keyset generated by the CE and transmitted to the AGO or FO. Such a function applied to the operational message results in a fixed length authentication tag that is appended to the message. The element receiving the message applies the same function and compares the results to the received tag. If the tags agree, the message must have come from the indicated source element, as only the source element and the receiving element share the key used to generate the tag. Certain messages (e.g., operational commands and acknowledgements) may be authenticated in their entirety. Other messages (e.g., messages carrying video), may only have their headers authenticated.

The AGO interface also may be used to update program code used by the control system, for example if a better algorithm has been developed for computing navigational data, or for autonomously controlling the AGO 110a, 110b. The control element 120 may include an interface for updating program code used by the key generator, while the control elements 120, 140 may have an interface for updating program code used by the respective cryptographic modules 124, 144 or the user interfaces 126, 146. These interfaces also may be used to program other types of information into the AGO, such as, for example, an intended target or coordinates for the intended target.

It should be understood that various embodiments of weapons systems in accordance with the invention need not include any forward observers having a secondary control element 140, or may include multiple forward observers, and it should be appreciated that the methods described below that pertain to a single secondary control element 140 may be repeated as necessary if multiple forward observers are present. It should also be understood that, while only one AGO 110a, 110b is shown, various embodiments may include multiple AGOs, and the primary control element 120 and/or secondary control element 140 may be configured to simultaneously control multiple AGOs. In particular, each AGO may have its own unique single-mission cryptographic key(s), and the user interface of any control element may display information about the AGOs and receive commands for controlling any (or all) of the AGOs according to its (or their) respective cryptographic keys.

Cryptographic Module

Figure 5C:
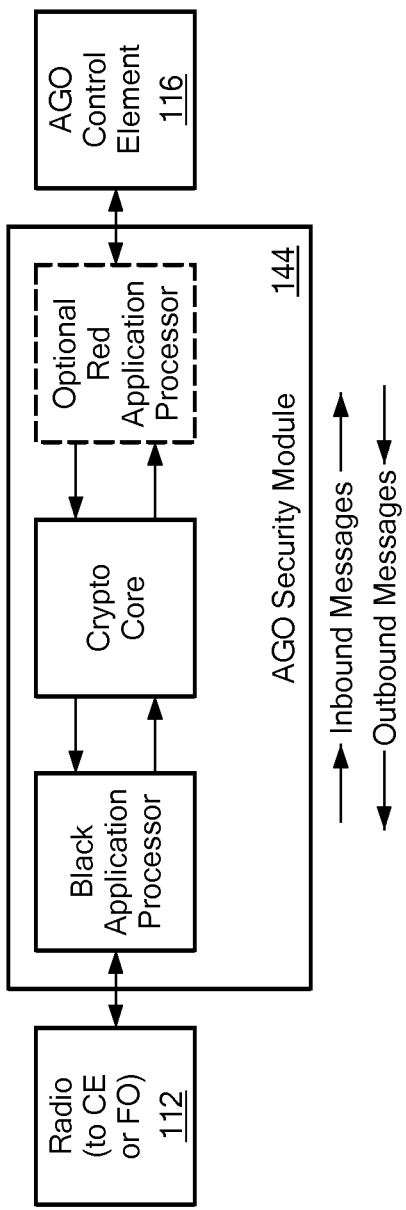

FIGS. 5(A)-(C) are schematic diagrams of an exemplary cryptographic module and related components that can be used in both the control element(s) and the AGO(s), including a representation FIG. 5(A) of the cryptographic module embedded in a control element, a representation FIG. 5(B) of the cryptographic module embedded in a forward observer, and a representation FIG. 5(C) of the cryptographic module embedded in an actively guided ordnance. Using standard terminology, the "red" side of a system is that part of the system that is exposed to sensitive (e.g., cleartext) information, or red signals. The "black" side of a system is that part of the system that should never be exposed to sensitive information. Signals that originate on the red side are always secured, typically through encryption, prior to being conveyed to the black side, and signals received from the black side must be decrypted before their contents can be meaningfully used. To illustrate this principle, the red side of the AGO 110a, 110b includes a portion of the cryptographic module 114 (which converts signals from red to black and vice-versa), and the control system 116. The black side of the AGO 110a, 110b includes the remaining portion of the cryptographic module 114, and the radio subsystem 112. Similarly, the red side of the control element 120 includes the user interface 126 and a portion of the cryptographic module 124, while the black side includes the remaining portion of the cryptographic module 124 and the radio subsystem 122. The red and black sides of secondary control element 140 are the same. It should be appreciated that, in each participating device 110a/110b, 120, 140, the cryptographic module has a red side and a black side. The cryptographic core therefore acts as a sort of firewall between red and black communications.

The cryptographic module must separate the classified (red) environment from the unclassified (black) communications environment. The operational system cannot have any connections between the red and the black environments other than through the crypto device. In order to support (1) one-to-many communications from the control element to the weapons and (2) red-side management of the communications devices, the crypto provides controlled bypass modes where certain information can pass from the red side to the black side in unencrypted form.

Message formats in an exemplary embodiment allow messages to be routed appropriately within and across the cryptographic module. Specifically, message formats include commands from the red side to the crypto core, commands from the cryptographic core to the Black application processor, data from the Black application processor to the crypto core, and data from the crypto core to the red side.

The AGO cryptographic module is a message oriented device. All messages across the boundary of the cryptographic core, in either direction, begin with a header that includes a Crypto Action field, an Ultimate Target/Original Source field, and a Message Length field. The Crypto Action field indicates whether the crypto core needs to process the message or simply pass it through. The Ultimate Target/Original Source field indicates the ultimate consumer, within the operational element, of messages moving in the red-to-black direction (e.g., the crypto core, a particular radio channel, or the Black application processor) or the original source, within the operational element, for messages moving in the black-to-red direction (e.g., a particular radio channel, the Black application processor, or the crypto core. The Message Length field indicates the number of message bytes following the header.

When messages, whether processed or unprocessed, cross the crypto core in either direction, the Action/Target or Action/Source parameters are passed with them. This enables the message recipient to direct the message to the proper handler.

Messages from the red to black direction include commands from the red-side to the crypto that are consumed by the crypto with nothing passed on to the Black application processor, commands from the red-side to the crypto to encrypt the message for transmission and to pass the results to the Black application processor (the Action/Target value indicates a designated radio channel/protocol combination for which the message should be formatted by the Black application processor), commands from the red-side to the Black application processor that are not processed by the crypto core, and commands from the red-side to manage a specified radio channel/protocol combination (these commands are specifically to the radio control channels, not the radio data channels, and will be checked by the Black application processor).

Messages from the black to red direction include responses by the crypto to commands from the red side, message from a radio channel that needs to be processed by the crypto (decrypted operational messages will be passed on to the red side along with the Action/Source value, which indicates to the red side over which radio channel the message arrived; key management messages will be consumed by the crypto core), messages from the Black application processor to the red side unprocessed by the crypto core (which may be responses to commands from the red side, or autonomous status messages to the red side), and messages from radio control channels to the red side unprocessed by the crypto core (which may be responses to commands from the red side, or autonomous status messages to the red side).

Red-Side Commands to the Crypto Core

The red side of a system element (system controller or weapon) needs to communicate with the red side of its associated crypto in order to send messages to another system element and to manage the operations of its own crypto. Furthermore the red side of the system control element needs to manage the operation and monitor the health of the crypto system as a whole (including the Black application processor), manage the generation and transmission of operational key material to cryptos in the weapons elements of the system, and manage the configuration of the radio(s) on the black side. Since the radios are specific to the implementation of the operational system these messages are simply passed through the crypto core and Black application processor to the radios themselves.

The following is the general command message format for messages from the red side to the crypto core or Black application processor:

| 0 | 1 | 2 | 3 | 4 | 5 | 6 | 7 | 0 | 1 | 2 | 3 | 4 | 5 | 6 | 7 |
|---|---|---|---|---|---|---|---|---|---|---|---|---|---|---|---|
| Action | | Predicate | | | Parameters<br>Payload Data<br>CRC | | | Sequence Number | | | | | | | |

The Action field indicates whether the message is a Send, Get, Set, or Execute message. The Predicate field indicates the target of the action (e.g. send message, get status). The Parameters field contains further details about the command. The Sequence Number field is incremented with each message send from the red side—it is used to track responses to commands. The Payload field is the contents of the command (which may contain variable length fields), where the overall message length is given by the Transport header discussed above. The CRC field is used to detect any corrupt bits in the message.

The following is the general response message format:

| 0 | 1 | 2 | 3 | 4 | 5 | 6 | 7 | 0 | 1 | 2 | 3 | 4 | 5 | 6 | 7 |
|---|---|---|---|---|---|---|---|---|---|---|---|---|---|---|---|
| [Echo Command]<br>OK | | | | | | | | [Echo Sequence Number]<br>Error Flags (TBD)<br>Payload Data<br>CRC | | | | | | | |

The first two bytes of the command (action, predicate, parameters, and sequence number) are echoed in the response to a command. The OK field indicates whether or not the command was processed properly. Error Flags provide detailed information about any problem that occurred when the OK field indicates that the command was not processed properly. The Payload field contains the information provided by the response. The CRC field is as above.

The following table lists the commands for management of the crypto core and the Black application processor:

| Action | Val | Predicate | Val | Parameters | Val |
|--------|-----|-----------|-----|------------|-----|
| Commands from Red Side to Crypto | | | | | |
| Transmit | 00 | Operational Message | 000 | Authenticate whole message | 001 |
| | | | | Authenticate crypto header only | 010 |
| | | | | No Authentication | 011 |

-continued

| Action | Val | Predicate | Val | Parameters | Val |
|---|---|---|---|---|---|
| | | Encrypt and Transmit Keysets via Black-Side Radio | 001 | Acknowledge expected | xx1 |
| | | Encrypt and Load Keysets Direct (crypto to crypto) | 011 | — | — |
| Get | 01 | Crypto Configuration | 000 | — | — |
| | | Keyset Status | 001 | — | — |
| | | Crypto Status | 010 | — | — |
| | | Public Key | 011 | — | — |
| | | Public Key via Black-Side | 100 | — | — |
| Set | 10 | Crypto Configuration | 000 | — | — |
| | | Authentication Credential | 001 | — | — |
| | | Keysets | 010 | Acknowledge expected | xx1 |
| Execute | 11 | Unlock Credential | 000 | — | — |
| | | Generate Keyset | 001 | — | — |
| | | Encrypt and Return Keysets | 010 | — | — |
| | | Erase Specified Keysets | 011 | | |
| | | Selftest | 10 | — | — |
| | | Zeroize | 101 | Operational Keys | xx1 |
| | | | | Asymmetric Keys | x1x |
| | | | | Other Data | 1xx |
| Commands from Red Side to Black application processor | | | | | |
| Get | 01 | Black application processor Config | 000 | — | — |
| Set | 10 | Black application processor Config | 000 | — | — |
| Execute | 11 | Black application processor Self-Test | 011 | — | — |
| Commands from Crypto to Black application processor | | | | | |
| Send | 00 | Message | 000 | — | — |
| | | Keysets | 001 | — | — |

All commands from the red-side to the crypto are acknowledged except where the "acknowledge expected" flag makes acknowledgement optional (flag=0).

The Operational Message command directs the crypto core to AES encrypt and authenticate the enclosed message for transmission to a specified device and to pass the results to the Black application processor. The following is the format of the Operational Message command:

| 0 | 1 | 2 | 3 | 4 | 5 | 6 | 7 | 0 | 1 | 2 | 3 | 4 | 5 | 6 | 7 |
|---|---|---|---|---|---|---|---|---|---|---|---|---|---|---|---|
| Action = "Send" | | | Predicate = "Op Message" | | | Parameters = "Auth Range" | | | | | Sequence Number | | | | |
| DK | Rsvd | | | | | Keyset ID | | | | Bypass Type | | | Bypass Length | | |
| Bypass Data | | | | | | | | | | | | | | | |
| Length of message to be encrypted | | | | | | | | | | | | | | | |
| Message to be encrypted (≤4000 bytes) | | | | | | | | | | | | | | | |
| CRC | | | | | | | | | | | | | | | |

The Keyset ID tells the crypto core which keyset to use to encrypt the message. DK (Use Default Keyset flag) tells the crypto core to use the lowest number encryption keyset in its keyset list. This is intended for use in AGO weapons, which would normally have a single encryption keyset, so that the red side would not need explicit knowledge of the encryption keyset ID. (But the black-side of the weapon may, depending on the radio protocol, still needs to know the node address of the control element.) Bypass Data Type indicates how the Black application processor is to interpret the bypass data. Bypass Data Length is the length, in bytes, of the bypass data. Length is the length of message to be encrypted. Message contains the operational message to be encrypted and transmitted to the designated address in the bypass data.

The output of this command is a command to the Black application processor to send the processed message to the destination indicated in the bypass data. The processed message consists of a crypto header, followed by the encrypted message, followed by an optional authentication tag.

The Encrypt and Transmit Keysets via Black-Side Radio command directs the crypto in the Control Element to encrypt and sign the designated keysets (using ECDH and ECDSA algorithms) for the target device, to incorporate the results as the payload of a "Set Keysets command," and to send the command to the crypto of the designated weapon via the black-side radio. The following is the format of the Encrypt and Transmit Keysets via Black-Side Radio command:

received messages (E/D=0). A keyset can only be used by a one entity for encryption of messages, but by many entities for decryption of messages.

The Encrypt and Load Keysets Direct (Crypto-to-Crypto) command directs the crypto in the Control Element to encrypt and sign the designated keysets (using ECDH and ECDSA algorithms) for the target device, to incorporate the results as the payload of a "Set Keysets command", and to send the command to the crypto of the designated weapon via a direct wire connection between the two cryptos. The following is the format of the Encrypt and Load Keysets Direct (Crypto-to-Crypto) command for sending keysets directly:

| 0 | 1 | 2 | 3 | 4 | 5 | 6 | 7 | 0 | 1 | 2 | 3 | 4 | 5 | 6 | 7 |
|---|---|---|---|---|---|---|---|---|---|---|---|---|---|---|---|
| Action = "Send" | | Predicate = "Keyset/Direct" | | | Parameters | | | Sequence Number | | | | | | | |
| Rsvd | | | | | | | | Length of Recipient's Public Key | | | | | | | |
| Recipient's ECDH Public Key (< 100 bytes) | | | | | | | | | | | | | | | |
| Number of keysets (N) | | | | | | | | E/D | Rsvd | | ID of Keyset (1) | | | | |
| E/D | Rsvd | ID of Keyset (i) | | | | | | E/D | Rsvd | | ID of Keyset (N) | | | | |
| CRC | | | | | | | | | | | | | | | |

The fields are the same as the corresponding fields in the "Encrypt and Transmit Keysets via Black-Side Radio" command. The recipient's public key would be obtained "out-of-band" in the manner described with respect to the "Encrypt and Transmit Keysets via Black-Side Radio" command. Fetching the public key over the direct crypto-to-crypto link entails sending a "Get" command to the weapon's crypto over that link. The weapon crypto would be aware that the Get came over the direct link and would send the results back over that link. Because the link is direct crypto-to-crypto, no bypass or similar address field required. But even with a short point-to-point wire link it will be necessary to encrypt the keysets for transmission.

The Get Public Key via Black-Side Radio command for fetching a weapon's ECDH credential (the weapons certificate which contains its ECDH public key) requires a field for the address of the weapon. This command is issued by the control element crypto as the first step of the "exchange"

| 0 | 1 | 2 | 3 | 4 | 5 | 6 | 7 | 0 | 1 | 2 | 3 | 4 | 5 | 6 | 7 |
|---|---|---|---|---|---|---|---|---|---|---|---|---|---|---|---|
| Action = "Send" | | Predicate = "Keyset/Black" | | | Parameters" | | | Sequence Number | | | | | | | |
| Rsvd | | | | | | | | Length of Recipient's Public Key | | | | | | | |
| Recipient's ECDH Public Key (< 100 bytes) | | | | | | | | | | | | | | | |
| Bypass Type | | Bypass Length | | | | | | Bypass Data | | | | | | | |
| Number of keysets (N) | | | | | | | | E/D | Rsvd | | ID of Keyset (1) | | | | |
| E/D | Rsvd | ID of Keyset (i) | | | | | | E/D | Rsvd | | ID of Keyset (N) | | | | |
| CRC | | | | | | | | | | | | | | | |

Recipient's public key: The Control Element may obtain this parameter "out-of-band", (e.g., by reading a bar code or QR code on the exterior of the weapon, from an RFID tag attached to the weapon, via a database of some sort, or via a "Get Public Key" command from the red side of the weapon to the weapon's crypto), or "in-band" by issuing a "Get Public Key via Black-Side Radio" command that queries the crypto of the weapon over the black-side radio. Bypass data is the same as that in the Send Operation Message command. Number of Keysets indicate the number of keyset ID fields that follow. Keyset ID indicates a particular keyset to transfer, and the associated Encrypt/Decrypt field indicates the receiver's usage of that keyset—for encrypting transmitted messages (E/D=1) or decrypting mode of the Send Keysets command (for both the red side and the black side cases). The following is the format for the Get Public Key via Black-Side Radio command:

| 0 | 1 | 2 | 3 | 4 | 5 | 6 | 7 | 0 | 1 | 2 | 3 | 4 | 5 | 6 | 7 |
|---|---|---|---|---|---|---|---|---|---|---|---|---|---|---|---|
| Action = "Get" | | Predicate = "Pub Key Black" | | | Parameters | | | Sequence Number | | | | | | | |
| Bypass Type | | Bypass Length | | | | | | Bypass Data | | | | | | | |
| Return Type | | Return Length | | | | | | Return Data | | | | | | | |
| CRC | | | | | | | | | | | | | | | |

The Set command is used by the red side to set the crypto configuration parameters, to load the authentication credential required to activate the crypto, and to load keysets into a crypto core. The following is the format of the Set command:

| 0 | 1 | 2 | 3 | 4 | 5 | 6 | 7 | 0 | 1 | 2 | 3 | 4 | 5 | 6 | 7 |
|---|---|---|---|---|---|---|---|---|---|---|---|---|---|---|---|
| Action = "Set" | | Predicate = | | Parameters | | | | Sequence Number | | | | | | | |
| Payload Length | | | | | | | | | | | | | | | |
| Payload Data | | | | | | | | | | | | | | | |
| CRC | | | | | | | | | | | | | | | |

The predicate field specifies the information to be set. The payload contains the values of the parameters to be set.

The Unlock Credential command is used to unlock the authentication credential that enables the crypto. The following is the format of the Unlock Credential command:

| 0 | 1 | 2 | 3 | 4 | 5 | 6 | 7 | 0 | 1 | 2 | 3 | 4 | 5 | 6 | 7 |
|---|---|---|---|---|---|---|---|---|---|---|---|---|---|---|---|
| Action = "Execute" | | Predicate = "Unlock" | | Parameters | | | | Sequence Number | | | | | | | |
| Payload Length | | | | | | | | | | | | | | | |
| Payload Data | | | | | | | | | | | | | | | |
| CRC | | | | | | | | | | | | | | | |

If an authentication credential has not been previously loaded into the crypto, the Unlock Credential command will return an error. The payload is the password or passphrase used to decrypt the private key of the authentication credential.

The Generate Keyset command is used to generate a new keyset. Keysets are generated by the crypto in the System Controller (never the cryptos in weapons). Each crypto contains a table that can hold up to 64 keysets. The keyset ID is the index (0-63) into the keyset table. The crypto in the system controller maintains keysets in their assigned slots until they are erased or overwritten by a newly generated keyset. Keysets from the crypto in the System Controller are sent to the appropriate weapons using the Send Keyset commands. While the keyset table of the crypto in the System Controller may have all its slots filled with keysets in order to support multiple weapons, the table in a weapon would, in most cases, have no more than four depending on how many different entities (such as a forward observer) were allowed to control the weapon, and whether the communications channels are one-way or two-way. The crypto configuration maintains default values for parameters such as AES key size and key update rate. This command has the ability to override those defaults on a keyset-by-keyset basis. The following is the format of the Generate Keyset command:

| 0 | 1 | 2 | 3 | 4 | 5 | 6 | 7 | 0 | 1 | 2 | 3 | 4 | 5 | 6 | 7 |
|---|---|---|---|---|---|---|---|---|---|---|---|---|---|---|---|
| Action = "Execute" | | Predicate = "Gen Keyset" | | Parameters | | | | Sequence Number | | | | | | | |
| Rsvd | | Keyset ID (0-63) | | | | | | Number of Parameters to Override | | | | | | | |
| Parm ID (1) | | Parameter (1) Value | | | | | | Parm ID (N) | | Parameter (N) Value | | | | | |
| CRC | | | | | | | | | | | | | | | |

The Encrypt and Return Keysets to Red Side command is used by the Control Element to obtain an encrypted and signed keyset for delivery to the weapon crypto via a red-side network. The following is the format of the Encrypt and Return Keysets to Red Side:

| 0 | 1 | 2 | 3 | 4 | 5 | 6 | 7 | 0 | 1 | 2 | 3 | 4 | 5 | 6 | 7 |
|---|---|---|---|---|---|---|---|---|---|---|---|---|---|---|---|
| Action = "Send" | | Predicate = "Keyset/Red" | | Parameters | | | | Sequence Number | | | | | | | |
| | | | | Rsvd | | | | Length of Recipient's Public Key | | | | | | | |
| | | | | Recipient's ECDH Public Key (< 100 bytes) | | | | | | | | | | | |
| | | Number of keysets (N) | | | | | | E/D | Rsvd | | ID of Keyset (1) | | | | |
| E/D | Rsvd | | ID of Keyset (i) | | | | | E/D | Rsvd | | ID of Keyset (N) | | | | |
| | | | | | | | | CRC | | | | | | | |

The fields are the same as the corresponding fields in the "Encrypt and Transmit Keysets via Black-Side Radio" command. The wrapped keysets are returned, as a response to the red-side Control Element. There is no bypass field required—the red-side of the Control Element has the responsibility of delivering the wrapped keysets to the red-side of the weapon via a red-side network. (The red-side of the weapon needs to be designed to receive this wrapped keyset from the Control Element, to create and send an appropriate Set Keyset command to its own crypto, and optionally to acknowledge that the keysets were received and validated.) Even though the keysets are sent via the red-side, they must still be encrypted, as operational key material must never exist unprotected outside of a crypto core.

The Erase Keysets command is used to erase specific keysets in the keyset table when they are no longer needed (the Zeroize command is used to perform a blanket erase of all of the keysets at once). The following is the format of the Erase Keysets command:

| 0 | 1 | 2 | 3 | 4 | 5 | 6 | 7 | 0 | 1 | 2 | 3 | 4 | 5 | 6 | 7 |
|---|---|---|---|---|---|---|---|---|---|---|---|---|---|---|---|
| Action = "Execute" | | | Predicate = "Erase Keysets" | | | | Parameters | | | | Sequence Number | | | | |
| | | Number of Keysets | | | | | | | Rsvd | | | Keyset ID | | | |
| Rsvd | | | | Keyset ID | | | | | Rsvd | | | Keyset ID | | | |
| | | | | | | | | CRC | | | | | | | |

The following is the format of the commands used to initiate crypto selftest and to perform zeroization. These commands do not have payloads. The predicate field specifies the particular command and the parameter field indicates specific options for the command.

| 0 | 1 | 2 | 3 | 4 | 5 | 6 | 7 | 0 | 1 | 2 | 3 | 4 | 5 | 6 | 7 |
|---|---|---|---|---|---|---|---|---|---|---|---|---|---|---|---|
| Action = "Execute" | | | Predicate | | | | | Parameters | | | | Sequence Number | | | |
| | | | | | | | | CRC | | | | | | | |

Commands from Crypto to Black Application Processor

When the crypto has processed an operational message, or wrapped a keyset, for transmission over a black-side radio, it uses the following command to provide the Black application processor with the information necessary to format the message for the radio:

| 0 | 1 | 2 | 3 | 4 | 5 | 6 | 7 | 0 | 1 | 2 | 3 | 4 | 5 | 6 | 7 |
|---|---|---|---|---|---|---|---|---|---|---|---|---|---|---|---|
| Action = "Send" | | | Predicate | | | | | Parameters | | | | Sequence Number | | | |
| Bypass Type | | | | Bypass Length | | | | | | | | Bypass Data | | | |
| | | | | Length of Message to Transmit | | | | | | | | | | | |
| | | | | Message to Transmit | | | | | | | | | | | |
| | | | | CRC | | | | | | | | | | | |

This command message has the same general format as the red-side Send Operational Message command. The bypass data is taken verbatim from that red-side send command. The message to transmit field consists of a 6-byte plaintext crypto header, followed by the encrypted message, followed (optionally) by an authentication tag. If the authentication is only on the header then the authentication tag immediately follows the header.

The following is the format of the Message to Transmit where the entire message is authenticated:

| 0 | 1 | 2 | 3 | 4 | 5 | 6 | 7 | 0 | 1 | 2 | 3 | 4 | 5 | 6 | 7 |
|---|---|---|---|---|---|---|---|---|---|---|---|---|---|---|---|
| Rsvd | | | | Length of Data that follows this field | | | | | | | | | | | |
| Auth Type | | | | Keyset ID | | | | Message Counter High | | | | | | | |
| Message Counter Mid | | | | | | | | Message Counter Low | | | | | | | |
| | | | | Message | | | | | | | | | | | |
| | | | | Authentication Tag (optional) | | | | | | | | | | | |

The following is the format of the Message to Transmit where only the crypto header is authenticated:

| 0 | 1 | 2 | 3 | 4 | 5 | 6 | 7 | 0 | 1 | 2 | 3 | 4 | 5 | 6 | 7 |
|---|---|---|---|---|---|---|---|---|---|---|---|---|---|---|---|
| Rsvd | | | | Length of Data that follows this field | | | | | | | | | | | |
| Auth Type | | | | Keyset ID | | | | Message Counter High | | | | | | | |
| Message Counter Mid | | | | | | | | Message Counter Low | | | | | | | |
| | | | | Authentication Tag | | | | | | | | | | | |
| | | | | Message | | | | | | | | | | | |

The length field in the crypto header is used by the Black application processor of the receiving crypto as the length field of the transport header. The length includes the remaining four bytes of the crypto header, the message itself, and the authentication tag if one exists.

The type field is used by the crypto core to direct the message as follows:
 a. 00: Send to the keymat handler
 b. 01: Send to the AES decryptor (authentication on the whole message)
 c. 10: Send to the AES decryptor (authentication on the crypto header only)
 d. 11: Send to the AES decryptor (no authentication tag present)
 e. If the type field=11, then a parameter in the specified keyset indicating that no authentication is expected must be set. This prevents a man-in-the-middle from modifying bits of an authenticated message by making it look like an unauthenticated message. The unauthenticated message mode is provided to support telemetry when testing weapon operations.

The keyset ID field indicates which keyset to use to decrypt the message (this field is ignored if Type=00).

The three bytes of message counter are used by the AES decryptor to synchronize with the keystream and to detect possible replay attacks (this field is ignored if Type=00).

Red Side Commands to Black Application Processor

These commands provide the red side with the ability to manage the configuration and obtain the status of the Black application processor. They have the following formats:

| 0 | 1 | 2 | 3 | 4 | 5 | 6 | 7 | 0 | 1 | 2 | 3 | 4 | 5 | 6 | 7 |
|---|---|---|---|---|---|---|---|---|---|---|---|---|---|---|---|
| Action = "Get" | | | | Predicate | | | | Parameters | | | | Sequence Number | | | |
| | | | | | | | | CRC | | | | | | | |

| 0 | 1 | 2 | 3 | 4 | 5 | 6 | 7 | 0 | 1 | 2 | 3 | 4 | 5 | 6 | 7 |
|---|---|---|---|---|---|---|---|---|---|---|---|---|---|---|---|
| Action = "Set" | | | | Predicate | | | | Parameters | | | | Sequence Number | | | |
| | | | | | | | | Payload Length | | | | | | | |
| | | | | | | | | Payload Data | | | | | | | |
| | | | | | | | | CRC | | | | | | | |

| 0 | 1 | 2 | 3 | 4 | 5 | 6 | 7 | 0 | 1 | 2 | 3 | 4 | 5 | 6 | 7 |
|---|---|---|---|---|---|---|---|---|---|---|---|---|---|---|---|
| Action = "Execute" | | | | Predicate | | | | Parameters | | | | Sequence Number | | | |
| | | | | | | | | CRC | | | | | | | |

What distinguishes these commands from the corresponding commands to the crypto core is the "target" in the transport header at the beginning of the command.

Black-Side Messages to the Crypto and Red Side

Messages coming into the crypto core from the black side are either processed by the crypto core or passed untouched to the red side (per the action field in the transport header). Processing by the crypto core may entail decrypting and authenticating an operational message then passing the plaintext message to the red side, or consuming the message itself as part of the key management process. This is determined by bits in the crypto header.

The Black application processor is responsible for prepending the transport header to all messages crossing from the Black application processor to the crypto core. The Black application processor implicitly knows the message length of any messages it generates. For non-operational communications messages from the radios, the Black application processor can either count the bytes in the message prior to initiating its transfer into the crypto core, or can extract the length from a length field in the message itself.

Operational messages all contain a message length in the first two bytes (as part of the crypto header), so the Black application processor only needs to prepend the Action/Source byte to the incoming message in order to begin streaming it to the crypto core immediately. This reduces latency in the overall message transfer time from source to destination.

Figure 2:
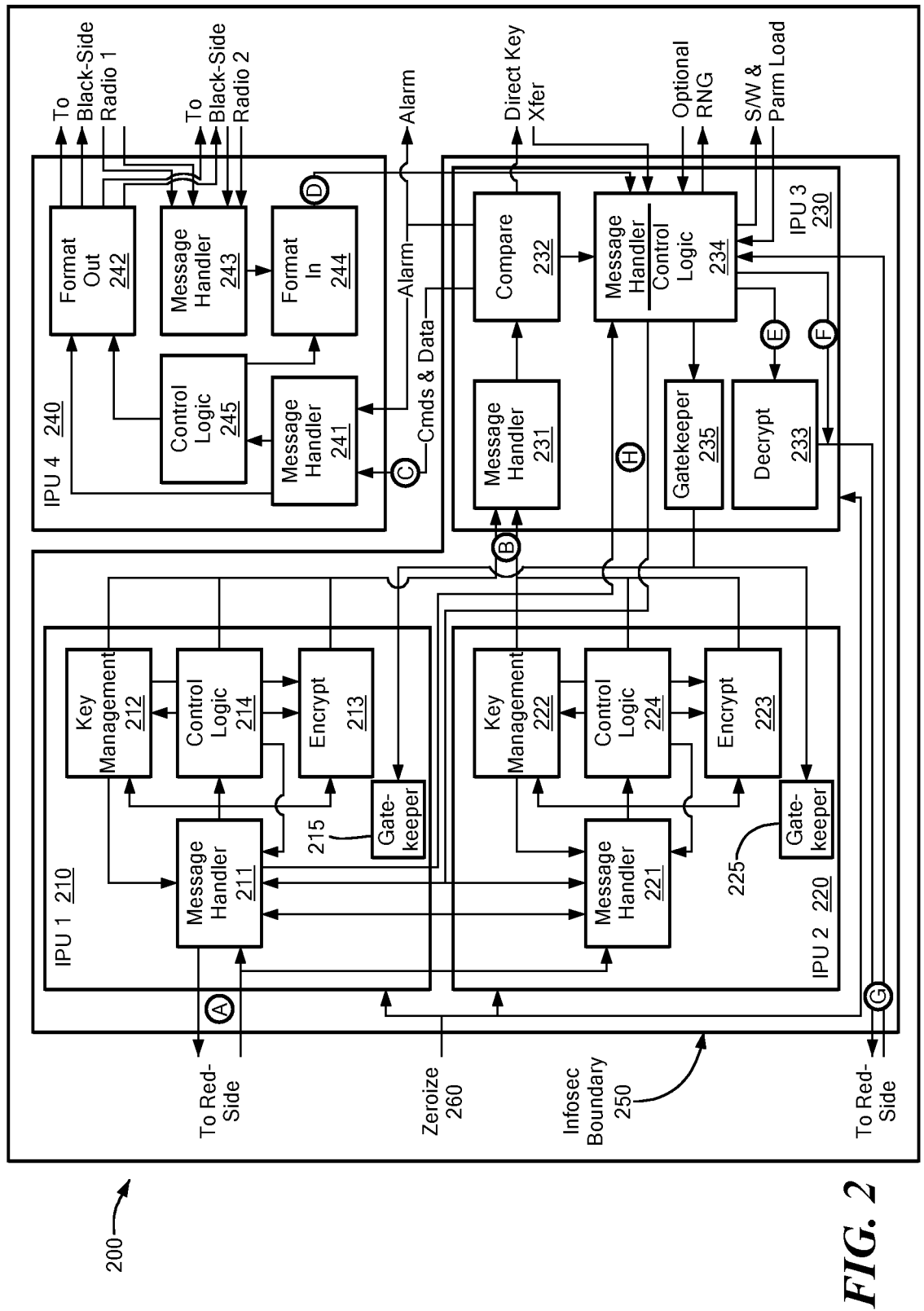
FIG. 2 schematically shows a communications module for performing cryptographic operations in accordance with an embodiment of the invention.

FIG. 2 schematically shows an architecture for a cryptographic module 200 of the type shown and described with reference to FIG. 5 for performing cryptographic operations in accordance with an exemplary embodiment of the invention. In this embodiment, the cryptographic module 200 is used in each of the cryptographic modules 114, 124, 144 described in connection with FIG. 1. However, the cryptographic module 200 is described below without regard to which role it plays in the weapons system of FIG. 1, i.e., without regard to whether the cryptographic module 200 is in the cryptographic module 114, the cryptographic module 124, or the cryptographic module 144. Rather, it is described generically in terms of the message processing functions that it performs; it should be understood that the cryptographic module 200 may be packaged differently for each of the different devices/roles in which the module is used and that the types of messages conveyed on "the red side" of the cryptographic module 200 will be different, depending on where the module is located within the weapons system. As one advantage of this design, cryptographic modules may be mass produced but deployed in a number of different roles in the weapons system. Also, a cryptographic core used in the cryptographic module 200 (e.g., in one exemplary embodiment, the "red" elements shown in FIG. 2) may be a separate device that is certified by the NSA for use across a wide variety of cryptographic modules and devices (e.g., for use in cryptographic modules used in control elements and AGOs), rather than implementing encryption/security separately for different devices and requiring the NSA to certify each separate implementation. Thus, for example, certain elements of the cryptographic module 200, e.g., the "black" processor, may be external to the certified cryptographic core. Such external elements may be packaged together with the certified cryptographic core on a cryptographic module, for example, as shown in FIG. 2, or may be physically separate from the cryptographic module itself (e.g., the "black" processor may be external to the cryptographic module 200. In any case, cryptographic modules may be certified independently of the certified cryptographic cores used in such modules, such that certification includes the cryptographic core in combination with any external elements contained on the cryptographic module. In this way, any software or hardware changes made to elements external to the certified cryptographic core should not affect the certification of the cryptographic core, and any software or hardware changes made to elements external to a certified cryptographic module should not affect the certification of the cryptographic module. The cryptographic module 200 may be configured with the capabilities of performing the control element and AGO roles, with the cryptographic module 200 configured to perform a particular role, e.g., using a hardware pin.

The exemplary cryptographic module 200 shown in FIG. 2 includes four independent processor units ("IPUs") 210, 220, 230, 240 that can be low-power microcontrollers, microprocessors, or programmable logic devices capable of executing cryptographic arithmetic operations, although, as discussed above, certain elements (e.g., the "black side" processor 240) may be, and typically are, external to the cryptographic module 200 itself. To meet security certification and accreditation requirements, encryption and key management functions are generally performed using redundant implementations to meet fail safe design requirements. Therefore, each cryptographic module 200 uses two IPUs 210, 220 to perform identical encryption and key management operations, the outputs of which are compared in a third IPU 230. The decryption function does not need to be performed redundantly, and may be performed in the IPU 230, or without loss of generality in a separate IPU (not shown) if greater processing throughput is desired. The IPUs 210, 220, 230 sit within an information security ("infosec") boundary 250 that logically delineates the components permitted to handle sensitive information; that is, on the "red side" of the module—as discussed above, the IPUs 210, 220, 230 residing within this "infosec" boundary 250 may be part of a separate cryptographic core device that is included in the cryptographic module 200. A fourth IPU 240 sits outside the infosec boundary 250; that is, on the "black side" and may be external to the cryptographic module itself. In one specific exemplary embodiment, the cryptographic module 200 is implemented with microprocessors that can provide permanent read and write protection of flash memory over external interfaces, and also can prevent execution of code from within RAM memory. This prevents private key material from being read over any electrical interfaces to the chip and also prevents injecting code into RAM that reads the key from program and exports it.

IPU 210 includes a message handler 211, a key management module 212, an encryption module 213, control logic 214, and a gatekeeper 215. IPU 220 includes a message handler 221, a key management module 222, an encryption module 223, control logic 224, and a gatekeeper 225. IPU 230 includes a message handler 231, a comparator 232, a decryption module 233, control logic 234 (that includes a second message handler), and a gatekeeper 235. IPU 240 includes a message handler 241, an output formatter 242, an a second message handler 243, an input formatter 244, and control logic 245. All of these components may be implemented in hardware, firmware, software, or a combination of hardware, firmware, and software. The operations of these components is now described in detail.

Messages for transmission typically include sensitive information, and are received on an interface denoted A from the red side in the message handlers 211, 221. The message handlers 211, 221 may communicate with each other to determine that the same message was received by both, as indicated. Subsequently, each IPU 210, 220 performs an identical parallel process; for brevity, this process is described only with respect to the first IPU 210.

When the message handler 211 receives a message, it alerts the control logic 214. The control logic stores the message in the encryption module 213. Next, the control logic 214 accesses the key management module 212 to determine whether the message can be encrypted using a valid single-mission cryptographic key. Messages may not be encrypted, for example, when no valid key is stored in the key management module 212. If the message may be encrypted, then the control logic 214 causes the key management module 212 to provide the key to the encryption module 213, which encrypts the message using the key.

Once both IPUs 210, 220 have performed this process in parallel to produce two encrypted messages, the messages are provided to the message handler 231 of IPU 230 using the interface denoted B. This message handler 231 ensures that both IPUs 210, 220 have completed their encryption processes, then passes a message to the comparator 232. For purposes of FIG. 2, only two encrypting IPUs 210, 220 are shown, however in some embodiments, more encrypting IPUs may be used. In these embodiments, the message handler 231 ensures that encrypted messages have been received from all encrypting IPUs before transmitting them to the comparator 232 for comparison.

The comparator 232 compares the results of the encryption process to determine whether the message has been properly encrypted. That is, if all of the results of the encryption process agree, then the message is correctly encrypted. If the message was properly encrypted, then the comparator 232 provides the properly encrypted message to the output message handler 241 using the red-to-black interface denoted C. Note that only encrypted data are presented from the red side to the black side of the cryptographic module 200. The message is then transmitted, as described in more detail below. The output message handler 241 may include a hardware or software data buffer to queue messages pending transmission.

However, if the message was not properly encrypted (for example, if one of the IPUs 210 or 220 has malfunctioned), then the comparator 232 takes two actions. First, it generates an alarm signal (that does not contain sensitive information) and presents it to the black side of the cryptographic module 200. The output message handler 241 transmits this alarm signal to inform the party or parties with which the enclosing device is communicating that an error has occurred. The alarm signal also may be used by other components on the black side of the enclosing device; for example, if the enclosing device is the control element 120, then an audible alarm may sound. Second, the comparator 232 sends a message to the control logic 234, which informs the IPUs 210, 220 of the error using the gatekeepers 235, 215, and 225. The IPU that has malfunctioned may then be disabled, leaving the remaining encrypting IPU(s) to continue functioning, thereby advantageously providing fault tolerance.

When encrypted data (or an alarm message) are ready for transmission, the output message handler 241 informs the control logic 245 using an electrical signal, and provides the message to the output formatter 242. The output formatter 242 then formats the digital data of the message for transmission under control of the control logic 245. Formatting a message may include converting it to a digital or analog format that is convenient for transmission on an underlying communications medium, such as a radio frequency or a sequence of radio frequencies. The output formatter 242 then sends the formatted message to an attached radio subsystem, which includes two radios in the exemplary embodiment shown in FIG. 2. The radio subsystem transmits the message over the communications medium.

Conversely, when a message is received from the radio subsystem, it is delivered to an input message handler 243. The input message handler 243 informs the control logic 245 using an electrical signal when the message is received. The input message handler 243 then provides the message to an input formatter 244, which formats the received message. The input message handler 243 may include a hardware or software buffer to queue received messages pending formatting. The input formatter 244 converts the received message, under control of the control logic 245, from the transmission format into a digital format convenient for further processing. Once the digital message is prepared, it is presented to the control logic 234 in the third IPU 230 using the black-to-red interface denoted D. Note that only properly formatted data are presented from the black side to the red side of the cryptographic module 200. If a received message is unable to be properly formatted as digital data, it may be discarded.

Incoming messages are received by the control logic 234, which also acts as an input message handler. The input message handler may include a hardware or software buffer to queue messages pending decryption. The control logic 234 then determines, based on the format of the message, whether the message requires decryption or not. The received message is sent to the decryption module 233 using the path denoted E. The decryption module 233 has been programmed with the single-mission cryptographic key, and may decrypt the message as using a stream cipher. The decrypted message is then transmitted to the remainder of the red side hardware and software using the interface denoted G.

The interface G also may be used to perform initialization operations, as described in more detail in connection with FIG. 3. Such initialization may include instructing the control logic 234 to obtain operational keymat including one or more single-mission encryption keys using a direct key transfer from an external source via a direct key transfer interface 236 (e.g., for directly programming operational keymat from the control element 120 to the AGO 110a); obtain a random number from the optional external random number generator (RNG) 125 of the control element 120 via optional RNG interface 237 (e.g., to allow the control element 120 to generate one or more single-mission encryption keys for the AGO 110); performing an update of various software and parameters from an external secure source via interface 238, including updating the encryption/decryption algorithm using the gatekeepers 235, 215, 225; and performing other such tasks. After performing the various requested functions, the control logic 234 may produce status values (e.g., 0 for failure, 1 for success) that are not encrypted. These status values may be returned through interface G via path F that bypasses the decryption module 233.

A separate interface 260 may be provided to obfuscate (e.g., erase, overwrite, zeroize, randomize, roll over, etc.) data stored in the red side IPUs 210, 220, 230 such as the single-mission cryptographic key(s). Any of a variety of well-known techniques can be used to erase, overwrite, zeroize, or randomize data (e.g., DOD 5520.22-M). An encryption key can be rolled over, for example, by a hashing function that can be scheduled to occur periodically by the AGO and the control element(s). This interface 260 may be activated in the AGO 110a if a mission must be aborted prior to use of the single-mission cryptographic key. By contrast, when a mission has been started and then completed (successfully or otherwise), the keys that have been used to encrypt and authenticate messages to the ordnance have been overwritten on the ordnance, and the private key of the credentials has been obfuscated. Subsequent missions use newly generated keys, ensuring that any previously used keys cannot be used by an adversary.

Figure 3:
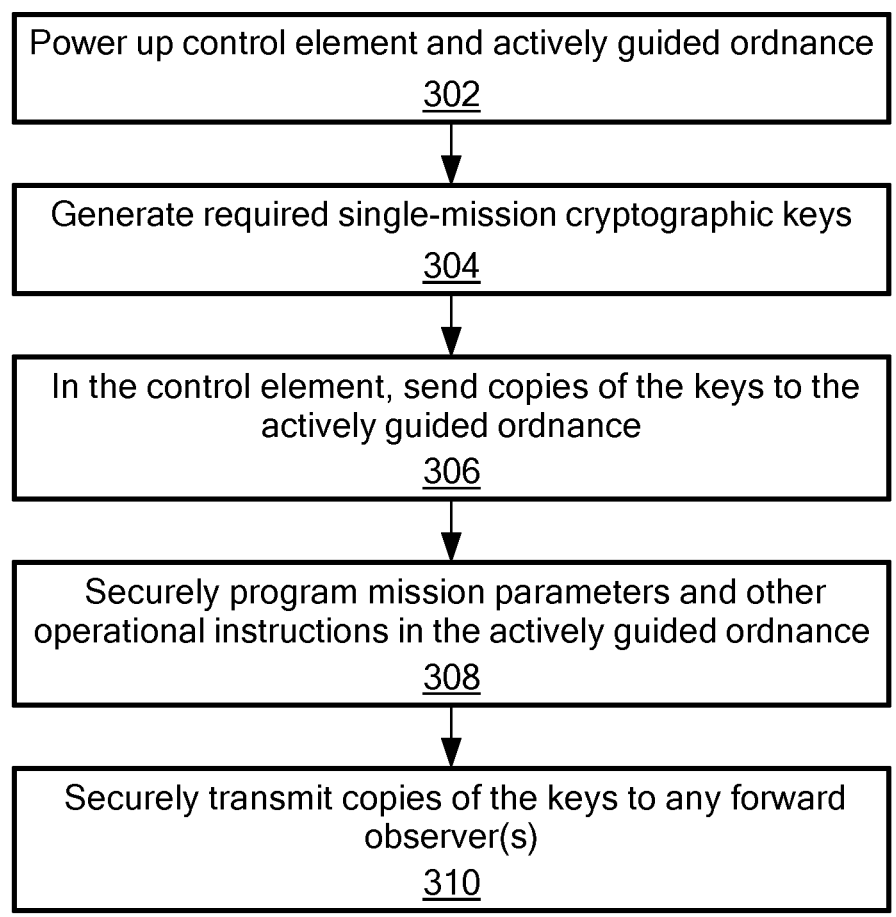
FIG. 3 is a flowchart illustrating a method of initializing the weapons system of FIG. 1.

FIG. 3 is a flowchart illustrating a method of initializing the weapons system of FIG. 1. In a first process 302, the control element and AGO are powered up. In case there are multiple AGOs under the control of a single control element, each AGO is powered up at this time. In a second process 304, all of the required single-mission cryptographic keys are generated. Typically, different keys are used for each direction of communication: from control element to AGO, from AGO to control element, from any forward observer to AGO, and from AGO to the forward observer. As noted above, in some embodiments key generation is performed by a key generator in the control element, while in other embodiments the keys are obtained elsewhere (for example, encoded in a physical barcode attached to the AGO). These keys are programmed into the control element, if they were not already generated there.

Next, in a process 306, the control element sends copies of the keys to the AGO. There are a number of ways to accomplish this process using wired or wireless electronic connections. If a wired connection is used, then no authentication is required. However, if a wireless connection is used, to prevent spoofing, a public key cryptographic algorithm may be used to authenticate the control element to the AGO. For example, a Diffie-Hellman (DH) key exchange using the elliptic curve digital signature algorithm (ECDSA) may be used to securely load the keys. Once the keys have been installed, in process 308 the control element securely programs mission parameters and other operational instructions in the AGO. Finally, if any forward observer(s) is to be used, in process 310 the necessary keys are securely transmitted to the forward observer using any known secure communications medium.

Figure 4:
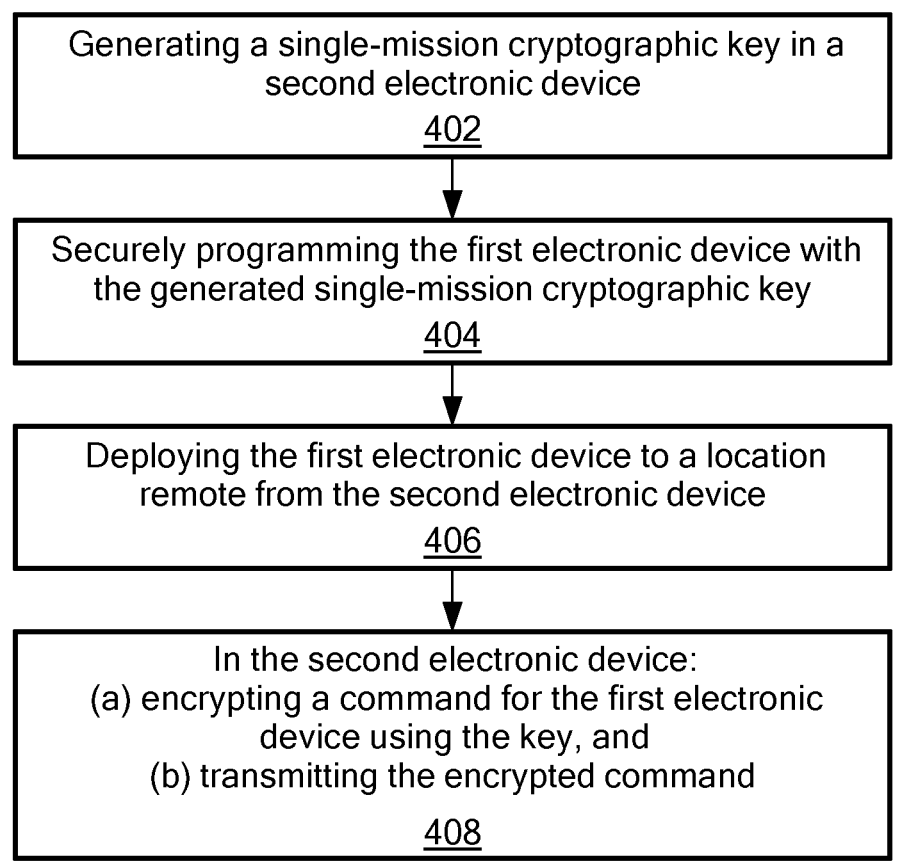
FIG. 4 is a flowchart illustrating a method of controlling a first electronic device using a short-term, high-security communications link over a public data communications medium in accordance with an embodiment of the invention.

FIG. 4 is a flowchart illustrating a method of controlling a first electronic device using a short-term, high-security communications link over a public data communications medium in accordance with an embodiment of the invention. In a first process 402, a second electronic device generates a single-mission cryptographic key, as described above. A second process 404 securely programs the first electronic device with the generated single-mission cryptographic key. In process 406, the first electronic device is deployed to a location remote from the second electronic device, for example by launching the first electronic device. Finally, in process 408, the second electronic device encrypts a command for the first electronic device using the single-mission cryptographic key, and then transmits the encrypted command to the first electronic device using the public data communications medium.

The implementation of the cryptographic device and the manner in which it is utilized addresses a communications security problem that is not handled by existing cryptographic systems. The system utilizes accepted NIST certified cryptographic protocols and methods. The novelty derives from the simplicity of design of the cryptographic device and the operational context in which the device is employed. Moreover, the design is suitable for implementation in software using only very small and low-power microprocessors (as opposed to firmware in logic arrays).

As a first advantage, when employed as envisioned on an AGO device, no explicit zeroization of the cryptographic module is required at the end of a mission (successful or not) to remove sensitive data or key material from the crypto device. Operational key material is updated during the mission so that any operational key remaining on the device will not have been used, and will never be used in the future. Moreover, private keys of credentials on an AGO, even if discovered by an adversary after a mission has executed (successfully or unsuccessfully) are of no value to the adversary because the information will never be reused. In addition, the private key is obfuscated from long term memory at a specified time after the AGO has been keyed. The delay allows a mission to abort without "bricking" the crypto device.

If the AGO detonates properly then the cryptographic device and any information on it should be destroyed. If the AGO fails to detonate then when the battery power fails the information in DRAM is lost. In any case, neither remaining operational key material nor private keys of credentials will ever be used again, so there is no security risk even if this information is somehow extracted from a recovered AGO.

As a second advantage, the core cryptographic device does not need to include a random number generator. Operational key material, ephemeral ECC keys for key distribution, and random numbers for ECDSA are not generated on AGO devices. The encryption modules for control elements and forward observers contain a separate hardware random number generator.

As a third advantage, connection to the core cryptographic module can be via a ball grid array on one side of the package. The module can be directly mounted onto a circuit board of the embedding AGO. The module can also be mounted onto a carrier board with pigtail leads and/or a connector, for applications where the module must be placed in "available space" of an AGO such as a small UAV.

As a fourth advantage, the credentials used for CE authentication and key transfer are created by a mechanism that is organic to the cryptographic system, since there is no need to communicate with any other entities. This allows the cryptographic functionality to be wholly self-contained within the weapon system program.

As a fifth advantage, the miniature cryptographic module is designed to operate in a high-G environment, such as might be found in a weapons system.

It should be noted that the systems and communication protocols described above can be employed with virtually any type of remotely controlled device and is not limited to ordnance.

It also should be noted that each control element may be, and often is, capable of controlling multiple remotely controlled devices simultaneously using the encryption key loading and communication protocols described above. Thus, for example, the primary control element may perform, for each remotely controlled device, (a) obtaining indicia from the remotely controlled device; (b) obtaining an RCD public key associated with the remotely controlled device based on the indicia; (c) generating a first operational keyset including a first single-mission encryption key for the remotely controlled device; (d) encrypting at least a portion of the first operational keyset using the RCD public key to form an encrypted first operational keyset; (e) transmitting the encrypted first operational keyset to the remotely controlled device over a key load interface; (f) encrypting a first command for the remotely controlled device using a CE in-use encryption key derived from the first single-mission encryption key; and (g) transmitting the encrypted first command to the remotely controlled device along with an authentication tag over a wireless communication link. The multiple RCDs may be part of a single mission (e.g., attacking a single target), or two or more of the RCDs may be part of separate missions (e.g., attacking different targets). In some cases, different RCDs may be handed over to different secondary control elements (FOs) in order to complete each RCD's mission. Thus, for example, the primary control element may control the launching or deployment of multiple RCDs headed to different targets, and then different secondary control elements may take over control of different RCDs on their way to their respective targets.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A remotely controlled device (RCD) that is stored unkeyed and is keyed at the time of deployment by a control element (CE), the RCD comprising:
   indicia readable by the CE from outside of the RCD; and
   a cryptographic module that stores an RCD private key and is configured to, at the time of deployment of the RCD (a) receive an encrypted first operational keyset from a control element over a key load interface, the encrypted first operational keyset including a first single-mission encryption key encrypted using an RCD public key associated with the RCD private key; (b) decrypt the encrypted first operational keyset using the RCD private key in order to obtain the first single-mission encryption key; (c) receive an encrypted first command from the CE over a first wireless communication link, the encrypted first command including information encrypted using a CE in-use encryption key derived from the first single-mission encryption key, along with an authentication tag; (d) authenticate the encrypted first command using the authentication tag and a pre-loaded hash key; and (e) decrypt the encrypted first command using a first RCD in-use encryption key derived from the obtained first single-mission encryption key; (f) receive an encrypted second operational keyset from the control element, the encrypted second operational keyset associated with a forward observer control element (FO) and including a second single-mission encryption key encrypted using the RCD public key associated with the RCD private key; (g) decrypt the encrypted second operational keyset using the RCD private key associated with the RCD public key in order to obtain the second single-mission encryption key; (h) receive an encrypted second command from the FO over a second wireless communication link; and (i) decrypt the encrypted second command using a second RCD in-use key derived from the second single-mission encryption key,
   wherein the RCD is an actively guided ordnance (AGO).

2. A remotely controlled device according to claim 1, further comprising:
   a near-field readable device containing the indicia.

3. A remotely controlled device according to claim 1, wherein the cryptographic module is configured to change the first RCD in-use key every N messages between the CE and the RCD, where N is greater than or equal to one.

4. A remotely controlled device according to claim 1, wherein the cryptographic module is configured to move at least a portion of the operational keysets from a non-volatile memory into a volatile memory and erase such portion from the non-volatile memory during the mission.

5. A remotely controlled device according to claim 1, wherein the cryptographic module comprises:
   at least one first microprocessor configured to encrypt data using a single-mission cryptographic key;
   a second microprocessor, configured to transmit and receive encrypted data using a public data communications medium; and
   a third microprocessor, coupled to the at least one first microprocessor and to the second microprocessor, the third microprocessor configured (a) to determine whether encrypted data received from the at least one first microprocessor are correctly encrypted, and if so, to provide these data to the second microprocessor for transmission, and (b) to determine whether a command received from the second microprocessor is authentic, and if so, to decrypt the received command using the single-mission cryptographic key.

6. A method for controlling a remotely controlled device (RCD) that is stored unkeyed and is keyed at the time of deployment by a control element (CE), the RCD having an RCD private key, the method comprising:
   at the time of deployment of the RCD:
   (a) receiving an encrypted first operational keyset from a control element over a key load interface, the encrypted first operational keyset including a first single-mission encryption key encrypted using an RCD public key associated with the RCD private key;
   (b) decrypting the encrypted first operational keyset using the RCD private key in order to obtain the first single-mission encryption key;

(c) receiving an encrypted first command from the CE over a first wireless communication link, the encrypted first command including information encrypted using a CE in-use encryption key derived from the first single-mission encryption key, along with an authentication tag;

(d) authenticating the encrypted first command using the authentication tag and a pre-loaded hash key;

(e) decrypting the encrypted first command using a first RCD in-use encryption key derived from the obtained first single-mission encryption key;

(f) receive an encrypted second operational keyset from the control element, the encrypted second operational keyset associated with a forward observer control element (FO) and including a second single-mission encryption key encrypted using the RCD public key associated with the RCD private key;

(g) decrypt the encrypted second operational keyset using the RCD private key associated with the RCD public key in order to obtain the second single-mission encryption key;

(h) receive an encrypted second command from the FO over a second wireless communication link; and (i) decrypt the encrypted second command using a second RCD in-use key derived from the second single-mission encryption key;

wherein the RCD is an actively guided ordnance (AGO).

7. A method according to claim 6, further comprising:
changing the first RCD in-use key every N messages between the CE and the RCD, where N is greater than or equal to one.

8. A method according to claim 6, further comprising:
moving at least a portion of the operational keysets from a non-volatile memory into a volatile memory and erase such portion from the non-volatile memory during the mission.

\* \* \* \* \*